(12) United States Patent
Wang et al.

(10) Patent No.: US 9,571,219 B2
(45) Date of Patent: Feb. 14, 2017

(54) WAVELENGTH-DIVISION MULTIPLEXER (WDM) AND DE-MULTIPLEXER (WDDM)

(71) Applicant: GTRAN Inc., Camarillo, CA (US)

(72) Inventors: Ruibo Wang, Oak Park, CA (US); Pawel Adam Menzfeld, Oak Park, CA (US)

(73) Assignee: EZCONN CORPORATION, Taipei (TW)

( * ) Notice: Subject to any disclaimer, the term of this patent is extended or adjusted under 35 U.S.C. 154(b) by 0 days.

(21) Appl. No.: 14/690,472

(22) Filed: Apr. 20, 2015

(65) Prior Publication Data

US 2015/0311995 A1 Oct. 29, 2015

Related U.S. Application Data

(60) Provisional application No. 61/983,977, filed on Apr. 24, 2014.

(51) Int. Cl.
*H04J 14/00* (2006.01)
*H04J 14/02* (2006.01)
*H04Q 11/00* (2006.01)
*G02B 6/293* (2006.01)
(Continued)

(52) U.S. Cl.
CPC ......... *H04J 14/0206* (2013.01); *G02B 6/2938* (2013.01); *G02B 6/29395* (2013.01); *G02B 6/32* (2013.01); *G02B 6/4215* (2013.01); *H04J 14/0209* (2013.01); *H04Q 11/0005* (2013.01); *H04Q 2011/0015* (2013.01); *H04Q 2011/0016* (2013.01)

(58) Field of Classification Search
CPC .... H04J 14/0204; H04J 14/02; H04J 14/0201; H04J 14/0206; H04J 14/0209; H04J 14/0212; H04J 14/021; H04Q 11/0005; H04Q 2011/0015; H04Q 2011/0016; G02B 6/32; G02B 6/262; G02B 6/2817; G02B 6/2938; G02B 6/29395; G02B 6/4215; G02B 6/3512; G02B 6/29367; G02B 6/3514
USPC ...................... 398/79, 85, 86, 88, 96, 48, 49
See application file for complete search history.

(56) References Cited

U.S. PATENT DOCUMENTS 6,658,177 B1 * 12/2003 Chertkow ............ G02B 6/3518
385/17
6,751,373 B2 * 6/2004 Jeong ................. G02B 6/29362
359/589

(Continued)

*Primary Examiner* — Hibret Woldekidan
(74) *Attorney, Agent, or Firm* — Min-Lee Teng; Litron Patent & Trademark Office

(57) ABSTRACT

A WDDM includes a base substrate; a first mirror on the base substrate; a second mirror on said base substrate; a third mirror on the base substrate; a first optical splitter on the base substrate, wherein the first mirror is configured to reflect a first light beam to the first optical splitter, wherein the first optical splitter is configured to split the first light beam into a second light beam exiting from a first light exit surface of the first optical splitter and a third light beam reflecting to the second mirror; and a second optical splitter on the base substrate, wherein the second mirror is configured to reflect the third light beam to the second optical splitter, wherein the second optical splitter is configured to split the third light beam into a fourth light beam exiting from a second light exit surface of the second optical splitter and a fifth light beam reflecting to the third mirror.

20 Claims, 18 Drawing Sheets

(51) Int. Cl.
  *G02B 6/32* (2006.01)
  *G02B 6/42* (2006.01)

(56) References Cited

U.S. PATENT DOCUMENTS

| | | | | |
|---|---|---|---|---|
| 7,599,619 | B2 * | 10/2009 | Strasser | G02B 6/29395 398/48 |
| 2002/0060835 | A1 * | 5/2002 | Holmes | G02B 6/356 359/250 |
| 2002/0172134 | A1 * | 11/2002 | Wilde | G02B 6/2551 369/112.27 |
| 2003/0099434 | A1 * | 5/2003 | Liu | G02B 6/29367 385/31 |
| 2004/0067014 | A1 * | 4/2004 | Hollars | G02B 6/29365 385/33 |
| 2004/0101306 | A1 * | 5/2004 | Morita | H04J 14/0201 398/85 |
| 2005/0259270 | A1 * | 11/2005 | Pocha | G01D 5/35303 356/519 |
| 2012/0134627 | A1 * | 5/2012 | Choo | G02B 6/4201 385/33 |
| 2013/0050707 | A1 * | 2/2013 | Parks | G06N 99/002 356/450 |
| 2013/0216180 | A1 * | 8/2013 | Tan | G02B 6/29367 385/24 |
| 2013/0327093 | A1 * | 12/2013 | Kalkowski | B32B 17/06 65/36 |

* cited by examiner

WAVELENGTH-DIVISION MULTIPLEXER (WDM) AND DE-MULTIPLEXER (WDDM)

This application claims priority to U.S. provisional application No. 61/983,977, filed on Apr. 24, 2014, all of which is incorporated herein by reference in their entirety.

BACKGROUND OF THE DISCLOSURE

Field of the Disclosure

The present disclosure relates to a wavelength-division multiplexer and de-multiplexer, and more particularly to a wavelength-division multiplexer and de-multiplexer with reduced deformation due to temperature changes.

Brief Description of the Related Art

Wavelength-division multiplexing (WDM) technique is widely used in fiber-optic systems for increasing the system's bandwidth. Conventional WDM modules include thin-film filters (TFF) or optical combiner, arrayed-waveguide gratings (AWG) and/or fiber-bragg gratings (FBG). The thin-film filter or optical combiner is advantageous due to its flat passband, low crosstalk and low temperature-dependence.

The thin-film filter or splitter employed for a WDM module or wavelength-division de-multiplexing (WDDM) module includes multiple layers of dielectric films. These layers of dielectric films form a multi-cavity Fabry-Perot interferometer. In such an interferometer, a center wavelength of its passband is dependent on the angle of incidence as indicated below:

$$w = w_0 \sqrt{1 - \left(\frac{1}{n_e}\right)^2 \sin^2\theta}$$

where w is the center wavelength of the filter or splitter with an external incident angle of $\theta$; $w_0$ is the center wavelength of the filter or splitter with normal incidence; and $n_e$ is an effective refractive index of a cavity spacer of the filter or splitter. From the above equation, the filter or splitter may have a passband with a shorted wavelength due to an increased angle of incidence on the filter or splitter. This filter or splitter has the above property so as to be tuned to meet wavelengths required by ITU (International Telecommunication Union).

FIG. 1 illustrates light paths of a conventional 8-channel WDDM module. Referring to FIG. 1, the WDM module 1 includes multiple filters or splitters 10 each configured to split a multiplexed light beam into an output light beam to pass through said each of the filters or splitters 10 to form a channel coupled with a fiber and another multiplexed light beam to be reflected from said each of the filters or splitters 10 to another one of the filters or splitters 10. The WDM module 1 includes another filter or splitter 11 configured to process a multiplexed light beam into an output light beam to pass through the filter or splitter 11 to form a channel coupled with a fiber. Thereby, the WDDM module may de-multiplex an input light beam at its input into the output light beams with different wavelengths λ1-λ8 respectively at its respective outputs coupled externally to the respective fibers.

Alternatively, the same configuration can be used for a WDM module by reversing the light propagation directions. FIG. 2 illustrates light paths of a conventional 8-channel WDM module. Referring to FIG. 2, each of the filters 10 acting as optical combiners may receive an input light beam, i.e. a channel of the WDM module, from one of the fibers to pass through said each of the filters or combiners 10 to be combined with a multiplexed light beam from another one of the filters or combiners 10 into another multiplexed light beam to propagate to the other one of the filters or combiners 10. The filter 11 may receive an input light beam, i.e. a channel of the WDM module, from one of the fibers to pass through the filter 11 into a multiplexed light beam to propagate to one of the filters or combiners 10. Thereby, the WDM module may multiplex the input light beams with different wavelengths λ1-λ8 at its inputs coupled externally to the respective fibers into an output light beam at its output.

SUMMARY OF THE DISCLOSURE

The present disclosure provides a wavelength-division multiplexer and de-multiplexer assembled with mirrors to fold light propagation such that the wavelength-division multiplexer and de-multiplexer may have a reduced length in one dimension. Thereby, the wavelength-division multiplexer may have its input light beams propagating substantially in parallel and in substantially the same direction and the wavelength-division de-multiplexer may have its output light beams propagating substantially in parallel and in substantially the same direction.

The present disclosure provides a wavelength-division multiplexer assembled with mirrors and filters, i.e. optical combiners, sandwiched between a base substrate and a cover substrate such that the mirrors and filters or combiners may have reduced deformation due to temperature changes.

The present disclosure provides a wavelength-division de-multiplexer assembled with mirrors and filters, i.e. optical splitters, sandwiched between a base substrate and a cover substrate such that the mirrors and filters may have reduced deformation due to temperature changes.

The present disclosure provides a wavelength division de-multiplexer comprising: a base substrate; a first mirror having a bottom side on said base substrate; a second mirror having a bottom side on said base substrate; a third mirror having a bottom side on said base substrate; a first optical splitter having a bottom side on said base substrate, wherein said first mirror is configured to reflect a first light beam to said first optical splitter, wherein said first optical splitter is configured to split said first light beam into a second light beam passing through said first optical splitter to exit from a first light exit surface of said first optical splitter and a third light beam reflecting to said second mirror; and a second optical splitter having a bottom side on said base substrate, wherein said second mirror is configured to reflect said third light beam to said second optical splitter, wherein said second optical splitter is configured to split said third light beam into a fourth light beam passing through said second optical splitter to exit from a second light exit surface of said second optical splitter and a fifth light beam reflecting to said third mirror, wherein said first light beam reflected from said first mirror to said first optical splitter is substantially parallel to said third light beam reflected from said second mirror to said second optical splitter, wherein said second light beam exiting from said first light exit surface is substantially parallel to said fourth light beam exiting from said second light exit surface and propagates in substantially the same direction as said fourth light beam propagates.

Further, the present disclosure provides a wavelength division multiplexer comprising: a base substrate; a first mirror having a bottom side on said base substrate; a second mirror having a bottom side on said base substrate; a third mirror having a bottom side on said base substrate; a first optical combiner having a bottom side on said base substrate, wherein said first mirror is configured to reflect a first light beam to said first optical combiner, wherein said first optical combiner is configured to combine said first light beam reflected from said first mirror and a second light beam incident to a first light incident surface of said first optical combiner and passing through said first optical combiner into a third light beam to propagate to said second mirror; and a second optical combiner having a bottom side on said base substrate, wherein said second mirror is configured to reflect said third light beam to said second optical combiner, wherein said second optical combiner is configured to combine said third light beam reflected from said second mirror with a fourth light beam incident to a second light incident surface of said second optical combiner and passing through said second optical combiner into a fifth light beam to propagate to said third mirror, wherein said third light beam propagating from said first optical combiner to said second mirror is substantially parallel to said fifth light beam propagating from said second optical combiner to said third mirror, wherein said second light beam incident to said first light incident surface is substantially parallel to said fourth light beam incident to said second light incident surface and propagates in substantially the same direction as said fourth light beam propagates.

These, as well as other components, steps, features, benefits, and advantages of the present disclosure, will now become clear from a review of the following detailed description of illustrative embodiments, the accompanying drawings, and the claims.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same reference number or reference indicator appears in different drawings, it may refer to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1:
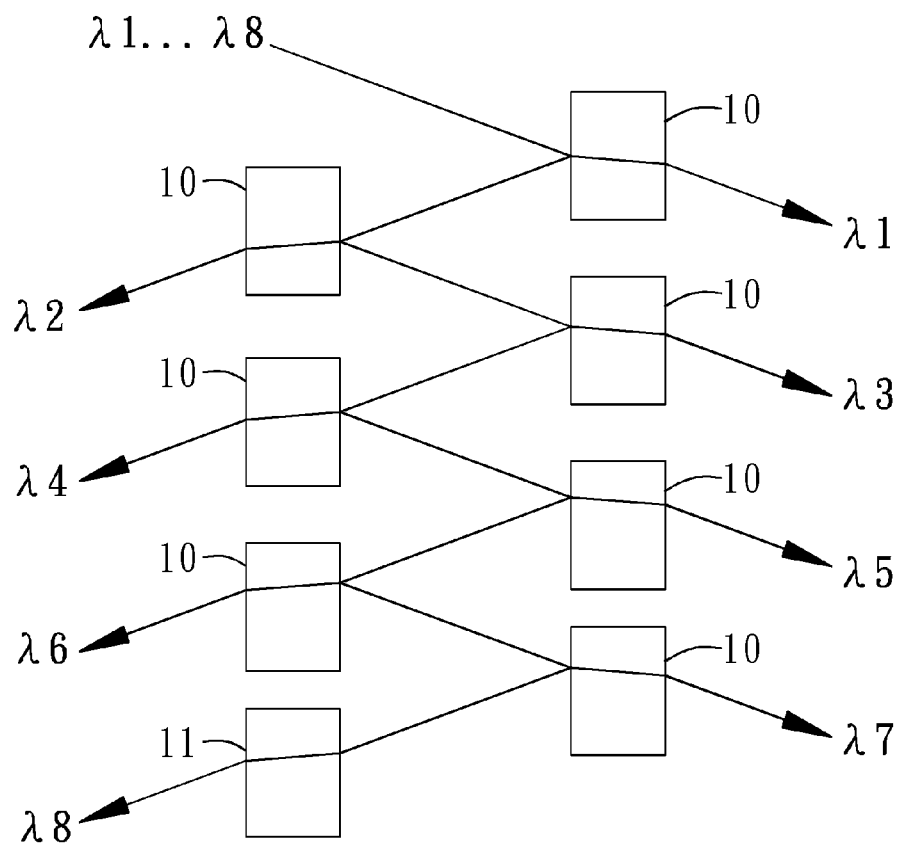
FIG. 1 illustrates light paths of a conventional 8-channel WDDM module.
Figure 2:
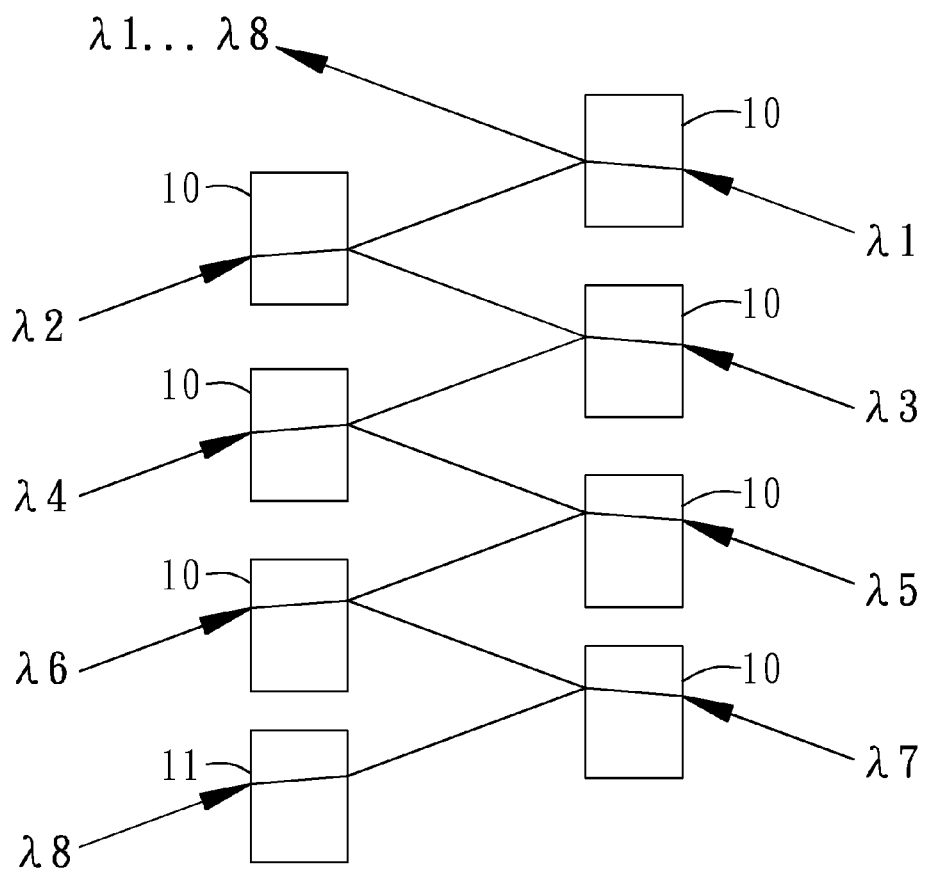
FIG. 2 illustrates light paths of a conventional 8-channel WDM module.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF THE INVENTION

Illustrative embodiments are now described. Other embodiments may be used in addition or instead. Details that may be apparent or unnecessary may be omitted to save space or for a more effective presentation. Conversely, some embodiments may be practiced without all of the details that are disclosed. When the same reference number or reference indicator appears in different drawings, it may refer to the same or like components or steps.

Figure 3:
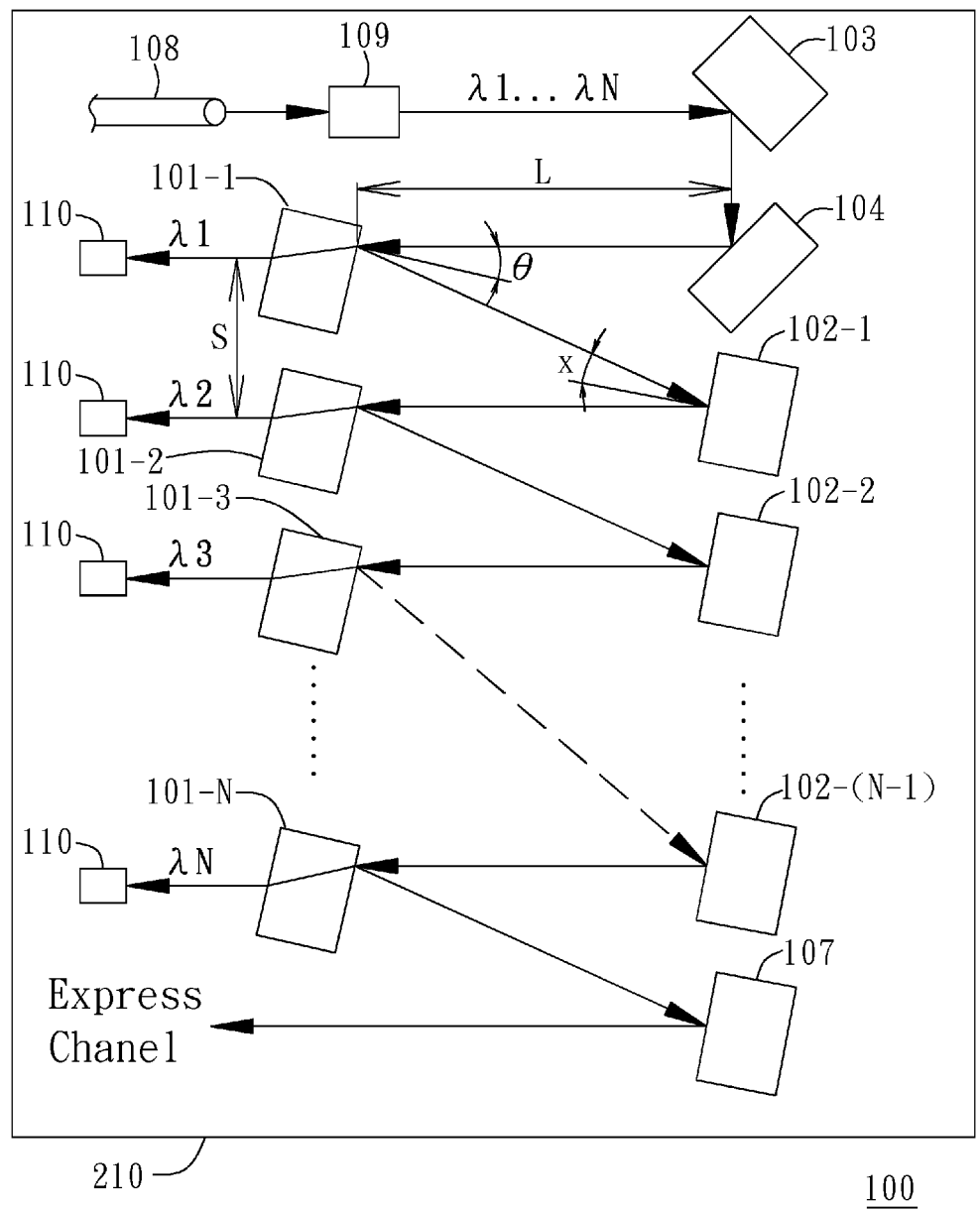
FIG. 3 illustrates a schematically top view of a light path of a WDDM module in accordance with a first embodiment of the present invention.
Figure 4:
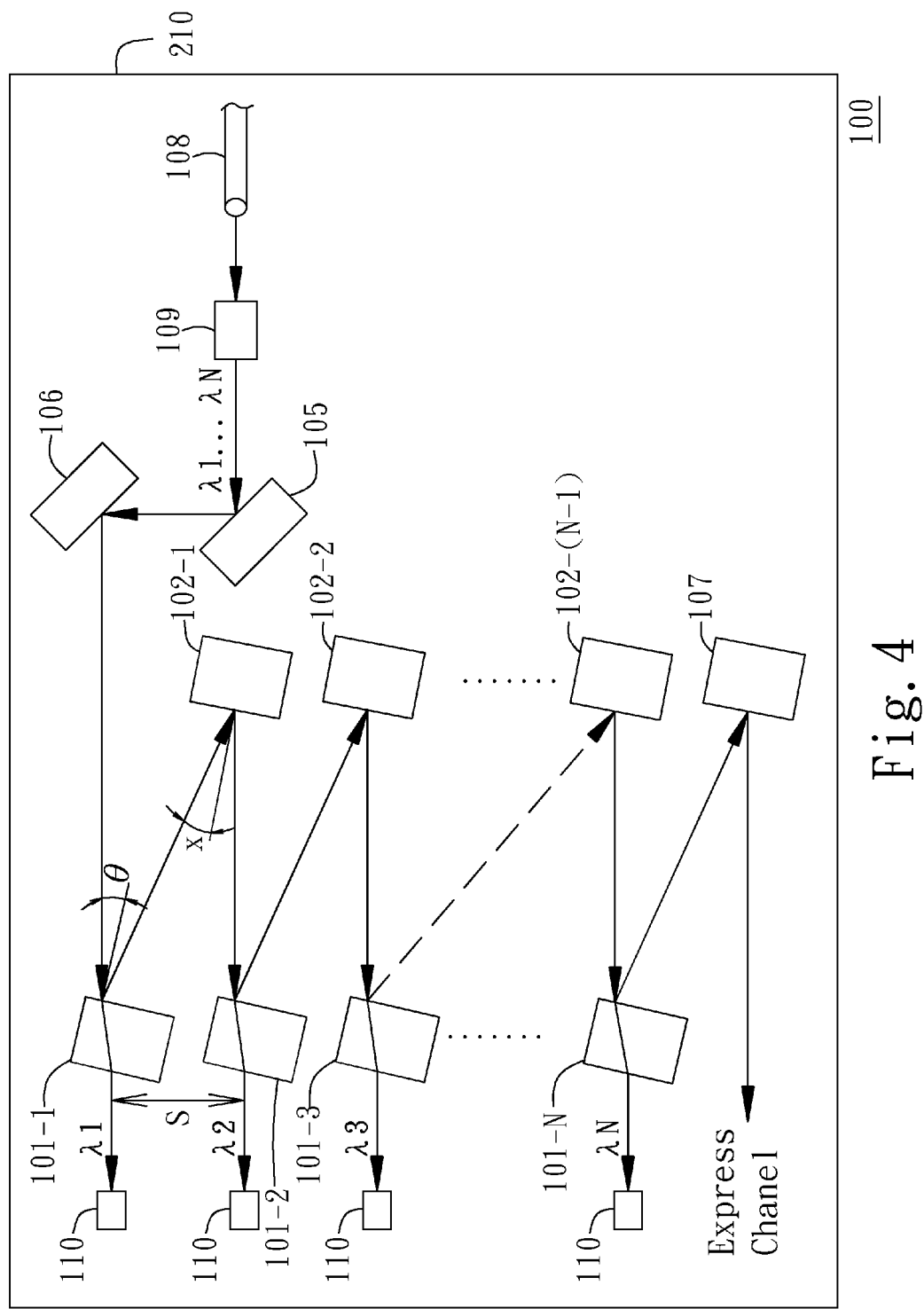
FIG. 4 illustrates a schematically top view of a light path of a WDDM module in accordance with a second embodiment of the present invention.

FIG. 3 illustrates a schematically top view of a light path of a WDDM module in accordance with a first embodiment of the present invention. FIG. 4 illustrates a schematically top view of a light path of a WDDM module in accordance with a second embodiment of the present invention. Referring to FIGS. 3 and 4, in the first embodiment, the WDDM module 100 may receive an input light beam, into which the number N of optical channels having non-overlapped center wavelengths $\lambda 1$-$\lambda N$ are multiplexed, at its optical input terminal and generate the number N of output light beams, de-multiplexed from the input light beam, at the number N of its output terminals, wherein each of the output light beams may have a corresponding one of the center wavelengths $\lambda 1$-$\lambda N$.

Referring to FIGS. 3 and 4, in order to de-multiplex the input light beam, the WDDM module 100 may include the number N of optical splitters 101-1 through 101-N sequentially optically coupled in series and arranged at a left side of the WDDM module 100 and the number (N−1) of mirrors 102-$n$ optically coupled between the optical splitters 101-$n$ and 101-($n$+1), wherein the optical splitter 101-$n$ may be coupled to the optical splitter 101-($n$+1) through the mirror 102-$n$ and the mirror 102-$n$ is configured to reflect a light beam split by the optical splitter 101-$n$ to the optical splitter 101-($n$+1) where n may be an integer ranging from, equal to or greater than 1 up to, equal to or less than (N−1). The optical splitter 101-$n$ may be configured to split an incident light beam associated with the input light beam reflected from the mirror 102-($n$−1) into an output light beam with the center wavelength $\lambda$n, propagating through the optical splitter 101-$n$ and then emitting from its light exit surface to one of light processors 110, and a split portion of the input light beam reflecting to the mirror 102-$n$ where n may be an integer ranging from, equal to or greater than 2 up to, equal to or less than (N−1). Thereby, the output light beam with the center wavelengths $\lambda$n may be filtered from the input light beam through the optical splitter 101-$n$. For example, the optical splitter 101-2 is configured to split an incident light beam associated with the input light beam reflected from the mirror 102-1 into an output light beam with the center wavelengths $\lambda 2$, propagating through the optical splitter 101-2 and then emitting from its light exit surface, and a split portion of the input light beam reflecting to the mirror 102-2. The output light beam with the center wavelengths $\lambda 2$ may be filtered from the input light beam through the optical splitter 101-2.

Referring to FIGS. 3 and 4, the WDDM module 100 may further include a mirror 107 to reflect a light beam, i.e. express channel, split by the optical splitter 101-N to propagate, substantially in parallel to the output light beams and in substantially the same direction as the output light beams propagate, to a light processor 110. Each of the light processors 110 may include an output collimator configured to receive one of the output light beams emitted from the optical splitters 101-1 through 101-N respectively and the light beam reflected from the mirror 107 and collimate said one of the output light beams, an optical detector configured to receive an optical signal associated with said collimated one of the output light beam and convert the optical signal into an electronic signal and an amplifier configured to amplify the electronic signal. Alternatively, multiple optical fibers may be provided to receive the collimated light beams emitted from the output collimators of the respective light processors 110.

In the first embodiment, referring to FIG. 3, the input light beam may be transmitted into the WDDM module 100 from the same side of the WDDM module 100, e.g., its left side, as the output light beams are emitted. The WDDM module 100 may include two mirrors 103 and 104 coupled to the optical splitter 101-1 and arranged at the right side of the WDDM module 100. The input light beam may be reflected sequentially by the mirrors 103 and 104 to propagate to the optical splitter 101-1 to split the input light beam into an output light beam with the center wavelengths $\lambda 1$, propagating through the optical splitter 101-1 and then emitting from its light exit surface, and a split portion of the input light beam reflecting to the mirror 102-1. Thereby, the output light beam with the center wavelengths $\lambda 1$ may be filtered from the input light beam by the optical splitter 101-1. The input light beam propagates from the mirror 104 to the optical splitter 101-1 in a direction substantially reverse to the direction where the input light beam propagates to the mirror 103. The input light beam may propagate from the mirror 103 to the mirror 104 in a direction substantially vertical to the direction where the input light beam propagates from the mirror 104 to the optical splitter 101-1 and the direction where the input light beam propagates to the mirror 103. The output light beams emitting from the light exit surfaces of the optical splitters 101-1 through 101-N respectively may propagate substantially in parallel and in substantially the same direction to the respective light processors 110 with substantially the same space S between each adjacent two of the output light beams. The light beam propagating to the mirror 103, the light beam propagating from the mirror 104 to the optical splitter 101-1, the light beams propagating from the mirror 102-$n$ to the optical splitter 101-($n$+1) and the light beam propagating from the mirror 107 may be substantially in parallel to each other or one another where n may be an integer ranging from, equal to or greater than 1 up to, equal to or less than (N−1). Substantially the same separation or space may be kept between each adjacent two of the light beams propagating from the mirror 104 to the optical splitter 101-1, from the mirrors 102-1 through 102-(N−1) to the optical splitters 101-2 through 101-N respectively and from the mirror 107 and may be substantially the same as the space S between each adjacent two of the output light beams. An input collimator 109 may be provided to collimate the input light beam transmitted from an optical fiber 108 and then the input light beam collimated by the input collimator 109 may be received by the mirror 103.

In the second embodiment, referring to FIG. 4, the input light beam may be transmitted into the WDDM module 100 from a different side of the WDDM module 100 than the output light beams are emitted. In this case, the input light beam may be transmitted into the WDDM module 100 from the right side of the WDDM module 100; the output light beams are emitted from the left side of the WDDM module 100. The WDDM module 100 may include two mirrors 105 and 106 coupled to the optical splitter 101-1 and arranged at the right side of the WDDM module 100. The input light beam may be reflected sequentially by the mirrors 105 and 106 to propagate to the optical splitter 101-1 to split the input light beam into an output light beam with the center wavelengths $\lambda 1$, propagating through the optical splitter 101-1 and then emitting from its light exit surface, and a split portion of the input light beam reflecting to the mirror 102-1. Thereby, the output light beam with the center wavelengths $\lambda 1$ may be filtered from the input light beam by the optical splitter 101-1. The input light beam may propagate to the mirror 105 in substantially the same direction as the input light beam propagates from the mirror 106 to the optical splitter 101-1. The input light beam may propagate from the mirror 105 to the mirror 106 in a direction substantially vertical to the direction where the input light beam propagates from the mirror 106 to the optical splitter 101-1 and the direction where the input light beam propagates to the mirror 105. The output light beams emitting from the light exit surfaces of the optical splitters 101-1 through 101-N respectively may propagate substantially in parallel and in substantially the same direction to the respective light processors 110 with substantially the same space S between each adjacent two of the output light beams. The light beam propagating to the mirror 105, the light beam propagating from the mirror 106 to the optical splitter 101-1, the light beams propagating from the mirror 102-$n$ to the optical splitter 101-($n$+1) and the light beam propagating from the mirror 107 may be substantially in parallel to each other or one another where n may be an integer ranging from, equal to or greater than 1 up to, equal to or less than (N−1). Substantially the same separation or space may be kept between each adjacent two of the light beams propagating from the mirror 106 to the optical splitter 101-1, from the mirrors 102-1 through 102-(N−1) to the optical splitters 101-2 through 101-N respectively and from the mirror 107 and may be substantially the same as the space S between each adjacent two of the output light beams. An input collimator 109 may be provided to collimate the input light beam transmitted from an optical fiber 108 and then the input light beam collimated by the input collimator 109 may be received by the mirror 105.

Thereby, referring to FIGS. 3 and 4, the input light beam may be reflected back and forth by a set of the mirrors 102-1 through 102-(N−1) at a right side of the WDDM module 100 and a set of the optical splitters 101-1 through 101-N at a left side of the WDDM module 100 such that the light path of the input light beam propagating in the WDDM module 100 may be folded. Accordingly, the WDDM module 100 may have a reduced length in one dimension.

Referring to FIGS. 3 and 4, in these configurations where the output light beams may have the respective center wavelengths $\lambda 1$-$\lambda n$ that are substantially the same as each other or one another, if all of the optical splitters 101-1 through 101-N have substantially the same angle θ of incidence of the input light beam and separation of each pair of the optical splitter 101-$n$ and the mirror 101-($n$−1), i.e. the distance in which the light beam propagates from the mirror 101-($n$−1) in said each pair to the optical splitter 101-$n$ in said each pair, is L where n may be an integer ranging from, equal to or greater than 2 up to, equal to or less than N, substantially the same separation S between each adjacent two of the output light beams with the respective center wavelengths $\lambda 1$-$\lambda n$ will be:

$$S = L \tan(2\theta)$$

In this case, referring to FIGS. 3 and 4, S may range from 0.5 mm to 5 mm; L may range from 1 mm to 25 mm; and θ may range from 0.5 degrees to 30 degrees. The light beams split from the optical splitters 101-1 through 101-(N−1) to the mirrors 102-1 through 102-(N−1) respectively and from the optical splitter 101-N to the mirror 107 may propagate substantially in parallel to each other or one another. Substantially the same separation or space may be kept between each adjacent two of the light beams split from the optical splitters 101-1 through 101-(N−1) to the mirrors 102-1 through 102-(N−1) respectively and from the optical splitter 101-N to the mirror 107. All of the mirrors 102-1 through 102-(N−1) and 107 may have substantially the same angle x of incidence of the input light beam, wherein the angle x of incidence may be substantially the same as the angle θ of incidence. The distance of the light beam propagating from the optical splitter 101-$n$ to the mirror 102-$n$ may be greater than that of the light beam propagating from the mirror 102-$n$ to the optical splitter 101-($n$+1) where n may be an integer ranging from, equal to or greater than 1 up to, equal to or less than (N−1).

Figure 5:
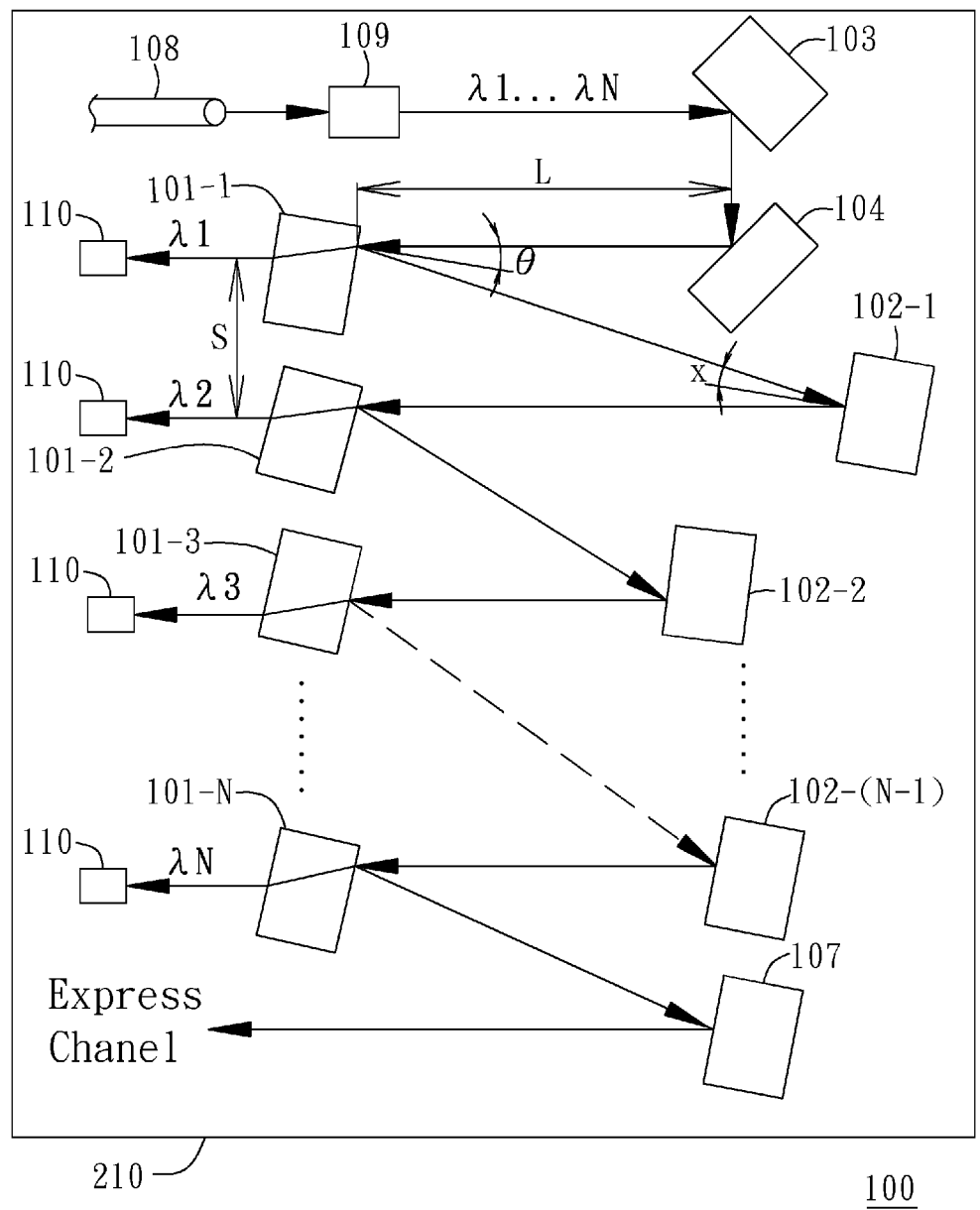
FIG. 5 illustrates a schematically top view of a light path of a WDDM module in accordance with a third embodiment of the present invention.
Figure 6:
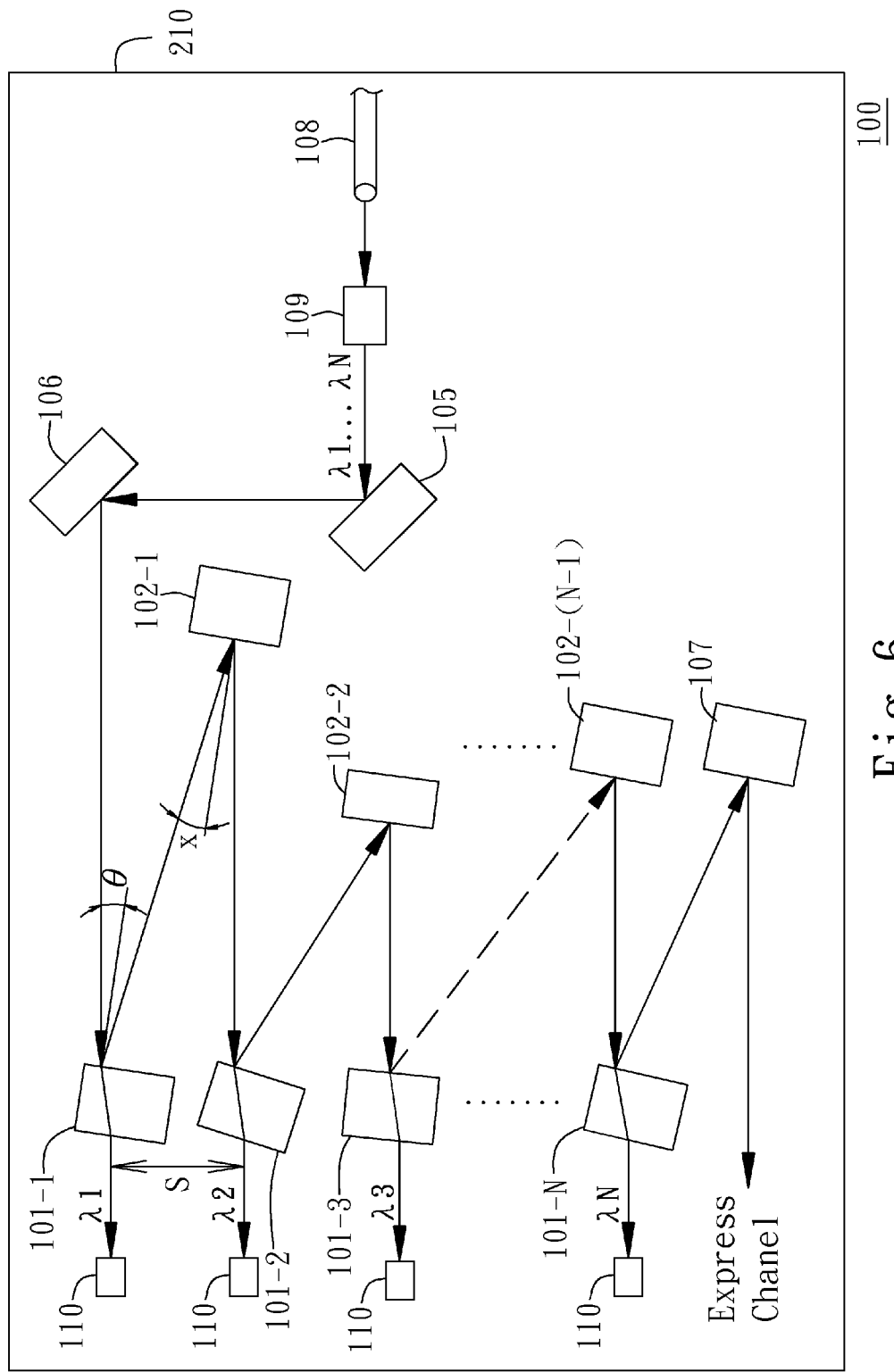
FIG. 6 illustrates a schematically top view of a light path of a WDDM module in accordance with a fourth embodiment of the present invention.

Alternatively, FIG. 5 illustrates a schematically top view of a light path of a WDDM module in accordance with a third embodiment of the present invention; FIG. 6 illustrates a schematically top view of a light path of a WDDM module in accordance with a fourth embodiment of the present invention. The element, as shown in FIG. 5, indicated by the same reference number as that in FIG. 3 may be referred to the illustration for that in FIG. 3. The element, as shown in FIG. 6, indicated by the same reference number as that in FIG. 4 may be referred to the illustration for that in FIG. 4. Referring to FIGS. 5 and 6, the optical splitters 101-1 through 101-N may have different angles θ of incidence of the input light beam from each other or one another in order to match various center wavelengths $\lambda 1$-$\lambda N$ of the output light beams required by International Telecommunication Union (ITU). The difference between two of the different angles θ of incidence may range from 0.1 degrees to 10 degrees. Alternatively, some of the optical splitters 101-1 through 101-N may have substantially the same angles θ of incidence of the input light beam. In order to keep substantially the same separation S between each adjacent two of the output light beams with the respective center wavelengths $\lambda 1$-$\lambda N$, the orientations and positions of the mirrors 102-1 through 102-(N−1) and 107 may be modified as shown in FIGS. 5 and 6. In this case, S may range from 0.5 mm to 5 mm. Accordingly, the light beams split from the optical splitters 101-1 through 101-(N−1) and 101-N to the mirrors 102-1 through 102-(N−1) and 107 respectively may propagate not in parallel to each other or one another. Separation of a pair of the optical splitter 101-$n$ and the mirror 101-($n$−1), i.e. the distance in which the light beam propagates from the mirror 101-($n$−1) in the pair to the optical splitter 101-$n$ in the pair, may be different from separation of another pair of the optical splitter 101-$n$ and the mirror 101-($n$−1), i.e. the distance in which the light beam propagates from the mirror 101-($n$−1) in the another pair to the optical splitter 101-$n$ in the another pair where n may be an integer ranging from, equal to or greater than 2 up to, equal to or less than N. Separation of a pair of the optical splitter 101-$n$ and the mirror 101-$n$, i.e. the distance in which the light beam propagates from the optical splitter 101-$n$ in the pair to the mirror 102-$n$ in the pair, may be different from separation of another pair of the optical splitter 101-$n$ and the mirror 101-$n$, i.e. the distance in which the light beam propagates from the splitter 101-$n$ in the another pair to the mirror 102-$n$ in the another pair where n may be an integer ranging from, equal to or greater than 1 up to, equal to or less than (N−1). The mirrors 102-1 through 102-(N−1) and 107 may have different angles x of incidence of the input light beam from each other or one another. The angle θ of incidence of the light beam propagating from the mirror 102-($n$−1) to the optical splitter 101-$n$ may the substantially the same as the angle x of incidence of the light beam propagating from the optical splitter 101-$n$ to the mirror 102-$n$ where n may be an integer ranging from, equal to or greater than 2 up to, equal to or less than N). The distance of the light beam propagating from the optical splitter 101-$n$ to the mirror 102-$n$ may be greater than that of the light beam propagating from the mirror 102-$n$ to the optical splitter 101-($n$+1) where n may be an integer ranging from, equal to or greater than 1 up to, equal to or less than (N−1). Separation or space between adjacent two of the light beams propagating from the mirrors 102-1 through 102-(N−1) to the optical splitters 101-2 through 101-N respectively may be different from that between other adjacent two of the light beams propagating from the mirrors 102-1 through 102-(N−1) to the optical splitters 101-2 through 101-N respectively.

Referring to FIG. 5, by adjusting the orientations and positions of the optical splitters 101-1 through 101-N and mirrors 102-1 through 102-(N−1) and 107, the output light beams emitting from the light exit surfaces of the optical splitters 101-1 through 101-N respectively may propagate substantially in parallel and in substantially the same direction to respective output collimators or photodetectors 110 with substantially the same space S between each adjacent two of the output light beams. The light beam propagating to the mirror 103, the light beam propagating from the mirror 104 to the optical splitter 101-1, the light beams propagating from the mirror 102-$n$ to the optical splitter 101-($n$+1) and the light beam propagating from the mirror 107 may be substantially in parallel to each other or one another where n may be an integer ranging from, equal to or greater than 1 up to, equal to or less than (N−1).

Referring to FIG. 6, by adjusting the orientation and position of the optical splitters 101-1 through 101-N and mirrors 102-1 through 102-(N−1) and 107, the output light beams emitting from the light exit surfaces of the optical splitters 101-1 through 101-N respectively may propagate substantially in parallel and in substantially the same direction to respective output collimators or photodetectors 110 with substantially the same space S between each adjacent two of the output light beams. The light beam propagating to the mirror 105, the light beam propagating from the mirror 106 to the optical splitter 101-1, the light beams propagating from the mirror 102-$n$ to the optical splitter 101-($n$+1) and the light beam propagating from the mirror 107 may be substantially in parallel to each other or one another where n may be an integer ranging from, equal to or greater than 1 up to, equal to or less than (N−1).

Referring to FIGS. 5 and 6, an auto-placing machine may perform the following steps to adjust the optical splitters 101-1 through 101-N and mirrors 102-1 through 102-(N−1) and 107:

(1) Measuring center wavelengths of the output light beams emitted from the light exit surfaces of the respective optical splitters 101-1 through 101-N with a normal or specific angle of incidence to the optical splitters 101-1 through 101-N;

(2) Calculating the orientations and positions of the optical splitters 101-1 through 101-N and the angle of incidence to the optical splitters 101-1 through 101-N such that the optical splitters 101-1 through 101-N may emit the output light beams with the center wavelengths $\lambda 1$-$\lambda N$ required by ITU with the separation of each adjacent two of the output light beams being substantially the same;

(3) Calculating the orientations and positions of the mirrors 102-1 through 102-(N−1) and 107 so as to keep or maintain substantially the same separation or space between each adjacent two of the output light beams with the respective center wavelengths $\lambda 1$-$\lambda N$; and (4) Using the auto-placing machine to mount the optical splitters 101-1 through 101-N and mirrors, i.e. 103, 104, 102-1 through 102-(N−1) and 107 for the third embodiment or 105, 106, 102-1 through 102-(N−1) and 107 for the fourth embodiment, onto a base substrate 210 with the calculated orientations and positions of the mirrors 102-1 through 102-(N−1) and 107.

Figure 7:
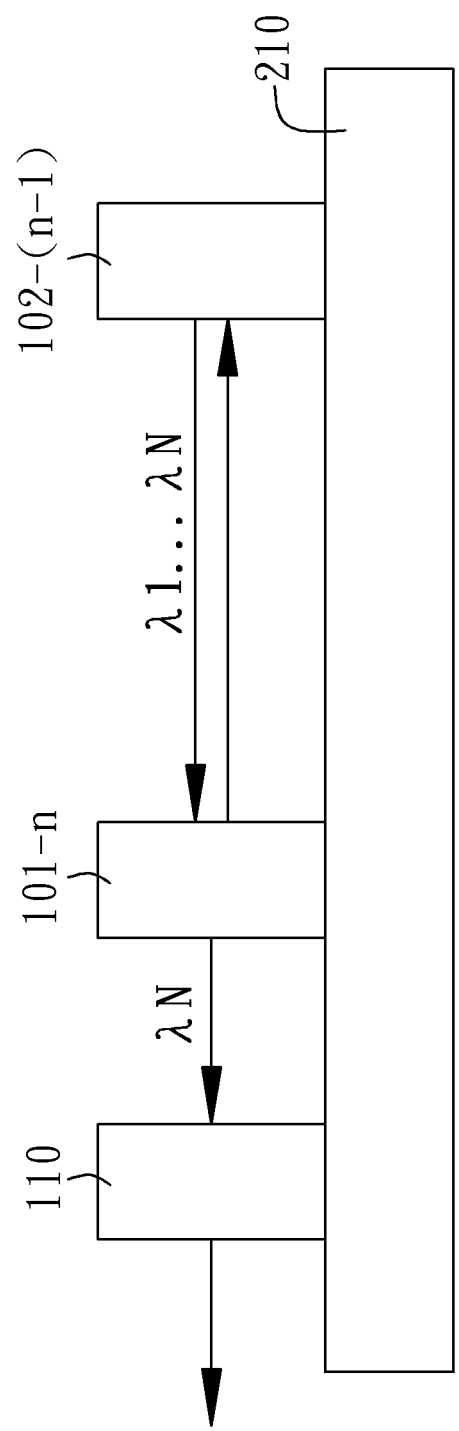
FIG. 7 is a schematically cross-sectional view of the WDDM module provided with a base substrate for supporting optical splitters and mirrors.
Figure 9:
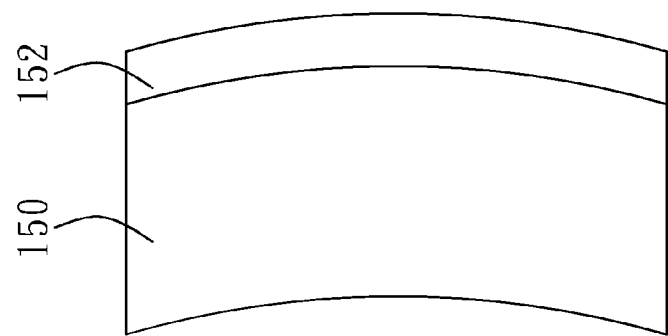
FIG. 9 is a schematically cross-sectional view of an optical splitter provided with the glass substrate and multilayer structure of dielectric films mismatching coefficients of thermal expansion (CTE)
Figure 8:
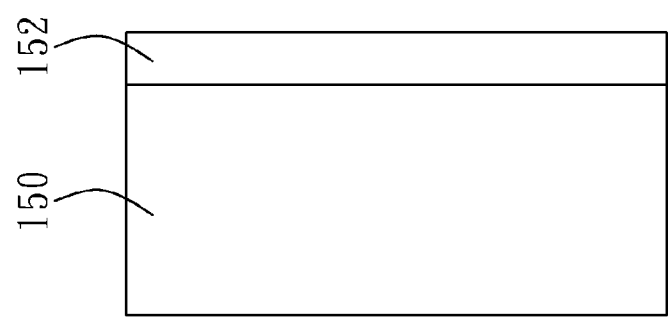
FIG. 8 is a schematically cross-sectional view of an optical splitter provided with a glass substrate and multilayer structure of dielectric films matching coefficients of thermal expansion (CTE)

FIG. 7 is a schematically cross-sectional view of the WDDM module provided with a base substrate for supporting optical splitters and mirrors. For the first and third embodiments, referring to FIGS. 3, 5 and 7, each of the optical splitters 101-1 through 101-N, mirrors 103, 104, 102-1 through 102-(N−1) and 107, input collimator 109 and output collimator of the light processor 110 may a bottom side mounted onto a top surface of a common base substrate 210. The optical splitters 101-1 through 101-N are usually fabricated using a vacuum deposition method. FIG. 8 is a schematically cross-sectional view of an optical splitter provided with a glass substrate and multilayer structure of dielectric films matching coefficients of thermal expansion (CTE). As shown in FIG. 8, each of the optical splitters 101-1 through 101-N may include a glass substrate 150 and a multilayer structure 152 of dielectric films on the glass substrate 150. Due to the difference in coefficient of thermal expansion (CTE) between the multilayer structure 152 of dielectric films and the glass substrate 150 and between the glass substrate 150 and the base substrate 210, temperature change may cause the optical splitters 101-1 through 101-N to be deformed, as shown in FIG. 9, and cause the light paths of the output light beams emitted from the optical splitters 101-1 through 101-N respectively and/or the input light beams reflected back and forth by the set of the mirrors 102-1 through 102-(N−1) and the set of the optical splitters 101-1 through 101-N to be changed. FIG. 9 is a schematically cross-sectional view of an optical splitter provided with the glass substrate and multilayer structure of dielectric films mismatching coefficients of thermal expansion (CTE). Hence the light coupling efficiency of the WDDM module is optimized only at the temperature in which the light paths of the output light beams emitted from the optical splitters 101-1 through 101-N respectively and the input light beam reflected back and forth by the set of the mirrors 102-1 through 102-(N−1) and the set of the optical splitters 101-1 through 101-N are substantially in parallel to a top surface of the base substrate 210, as shown in FIG. 7.

Figure 10:
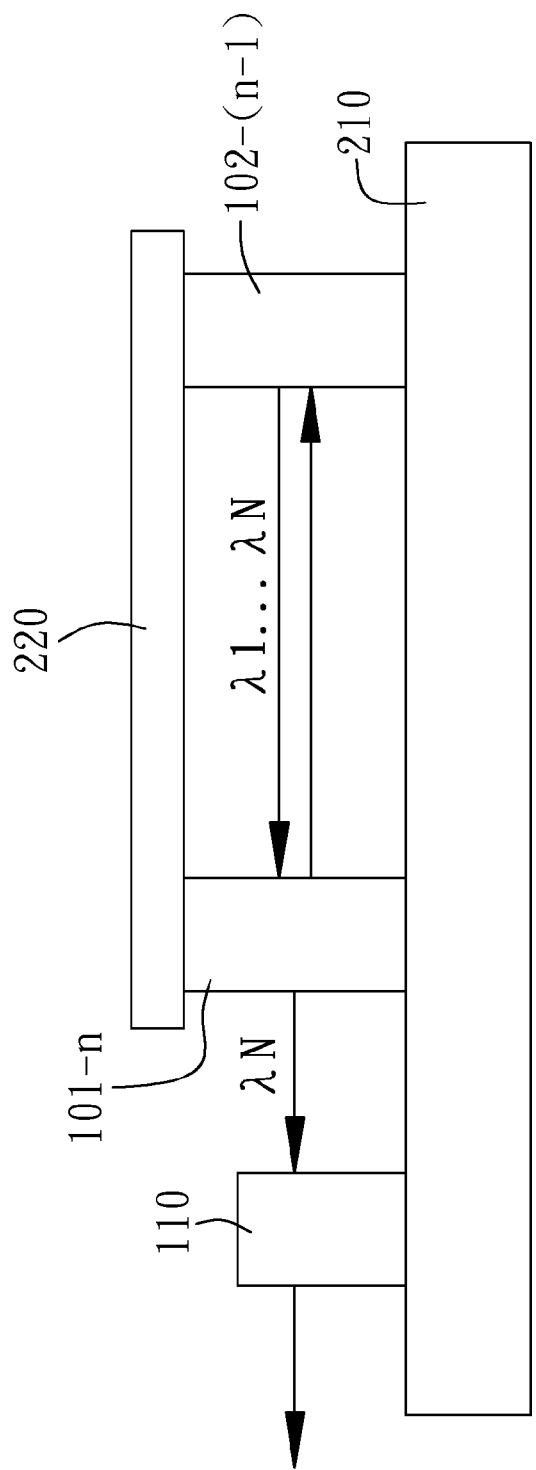
FIG. 10 is a schematically cross-sectional view of the WDDM module provided with a sandwich structure for optical splitters and mirrors.

In order to reduce the deformation, a sandwich structure is provided as shown in FIG. 10. FIG. 10 is a schematically cross-sectional view of the WDDM module provided with a sandwich structure for optical splitters and mirrors. Referring to FIGS. 3, 5 and 10, a cover substrate 220 may be provided to have a bottom surface mounted onto a top side of each of the optical splitters 101-1 through 101-N and mirrors 103, 104, 102-1 through 102-(N−1) and 107. Thereby, the optical splitters 101-1 through 101-N and mirrors 103, 104, 102-1 through 102-(N−1) and 107 are sandwiched between the base substrate 210 and the cover substrate 220 such that the optical splitters 101-1 through 101-N and mirrors 103, 104, 102-1 through 102-(N−1) and 107 may have reduced deformation due to temperature changes and allow a wide range of temperature change. Therefore, the light paths of the output light beams emitted from the optical splitters 101-1 through 101-N respectively and the input light beam reflected back and forth by the set of the mirrors 102-1 through 102-(N−1) and the set of the optical splitters 101-1 through 101-N are stabilized and temperature dependent loss (TDL) is reduced.

For the second and fourth embodiments, referring to FIGS. 4, 6 and 10, each of the optical splitters 101-1 through 101-N, mirrors 105, 106, 102-1 through 102-(N−1) and 107, input collimator 109 and output collimator of the light processor 110 may a bottom side mounted onto a top surface of a common base substrate 210. Further, a cover substrate 220 may have a bottom surface mounted onto a top side of each of the optical splitters 101-1 through 101-N and mirrors 105, 106, 102-1 through 102-(N−1) and 107. Accordingly, the optical splitters 101-1 through 101-N and mirrors 105, 106, 102-1 through 102-(N−1) and 107 are sandwiched between the base substrate 210 and the cover substrate 220 such that the optical splitters 101-1 through 101-N and mirrors 105, 106, 102-1 through 102-(N−1) and 107 may have reduced deformation due to temperature changes. Alternatively, the cover substrate 220 may be omitted as shown in FIG. 7.

The base substrate 210 and cover substrate 220 may be made of the same material, or different materials with similar thermal expansion coefficients. For example, the base substrate 210 may be made of a glass or ceramic substrate with a thickness t1 between 0.1 mm and 5 mm, and the cover substrate 220 may be made of a glass or ceramic substrate with a thickness t1 between 0.1 mm and 5 mm.

Figure 11:
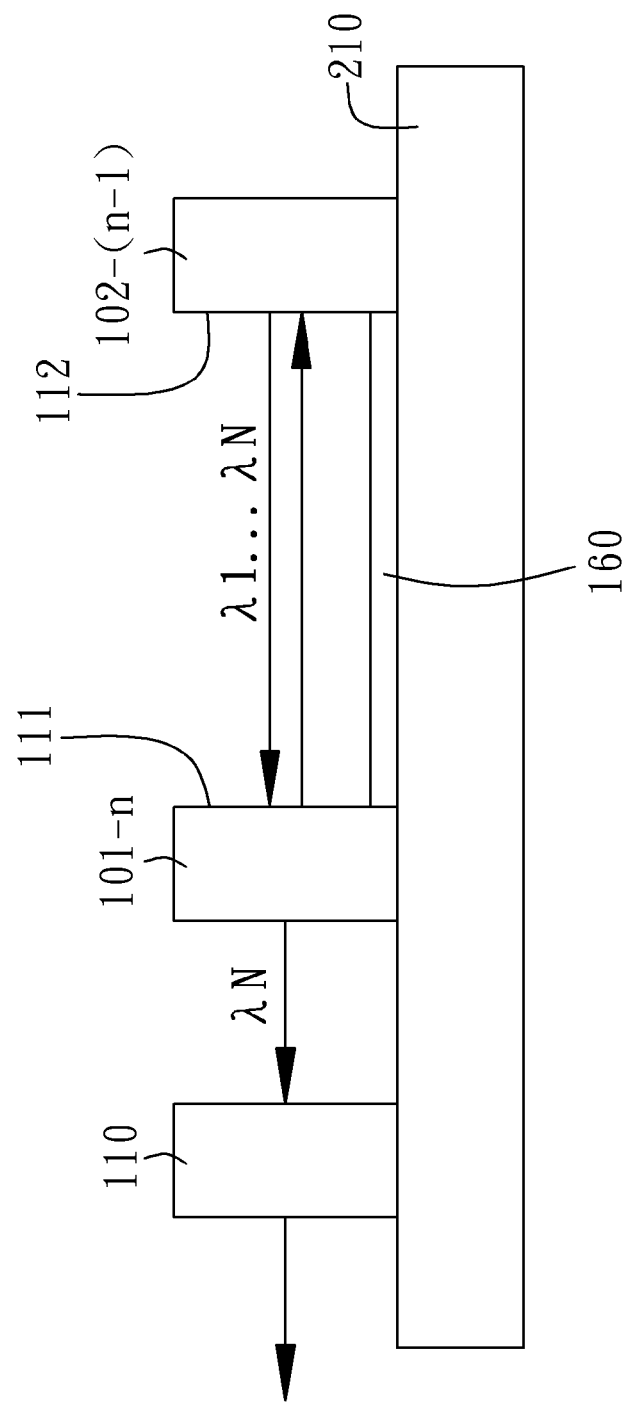
FIG. 11 is a schematically cross-sectional view of the WDDM module provided with a spacer between a set of optical splitters and a set of mirrors.

FIG. 11 is a schematically cross-sectional view of the WDDM module provided with a spacer between a set of optical splitters and a set of mirrors. Referring to FIG. 11, in order to align the optical splitters 101-1 through 101-N in required positions and angles relative to the mirrors 102-1 through 102-(N−1), a spacer 160 may be further provided on the base substrate 210 and between the set of optical splitters 101-1 through 101-N at the left side of the WDDM module 100 and the set of mirrors 102-1 through 102-(N−1) at the right side of the WDDM module 100. The spacer 160 may be precisely made per the requirements for alignment of the optical splitters 101-1 through 101-N and the mirrors 102-1 through 102-(N−1). The spacer 160 may be made of a glass or ceramic substrate with a thickness t1 between 0.01 mm and 1 mm. In an alignment procedure, the optical splitters 101-1 through 101-N are pushed against left sides of the spacer 160 before being fixed on the base substrate 120, and the mirrors 102-1 through 102-(N−1) are pushed against right sides of the spacer 160 before being fixed on the base substrate 120. Accordingly, precise positions and orientations for the optical splitters 101-1 through 101-N and the mirrors 102-1 through 102-(N−1) are easily achieved. Thereby, the spacer 160 may have the left edges abutting against light incident sides 111, configured to receive and reflect the input light beam, of the optical splitters 101-1 through 101-N and the right edges abutting against light reflecting sides 112, configured to reflect the input light beam, of the mirrors 102-1 through 102-(N−1). Alternatively, the space 160 may be composed of multiple discrete portions, each of which may be positioned on the base substrate 210 and may have a light incident surface of one of the optical splitter 101-($n$+1) abut against a left side thereof and have a light reflecting surface of one of the mirror 102-$n$ abut against a right side thereof where n may be an integer ranging from, equal to or greater than 1 up to, equal to or less than (N−1). Each of the discrete portions of the spacer 160 may be made of a glass or ceramic substrate with a thickness t1 between 0.01 mm and 1 mm.

Figure 12:
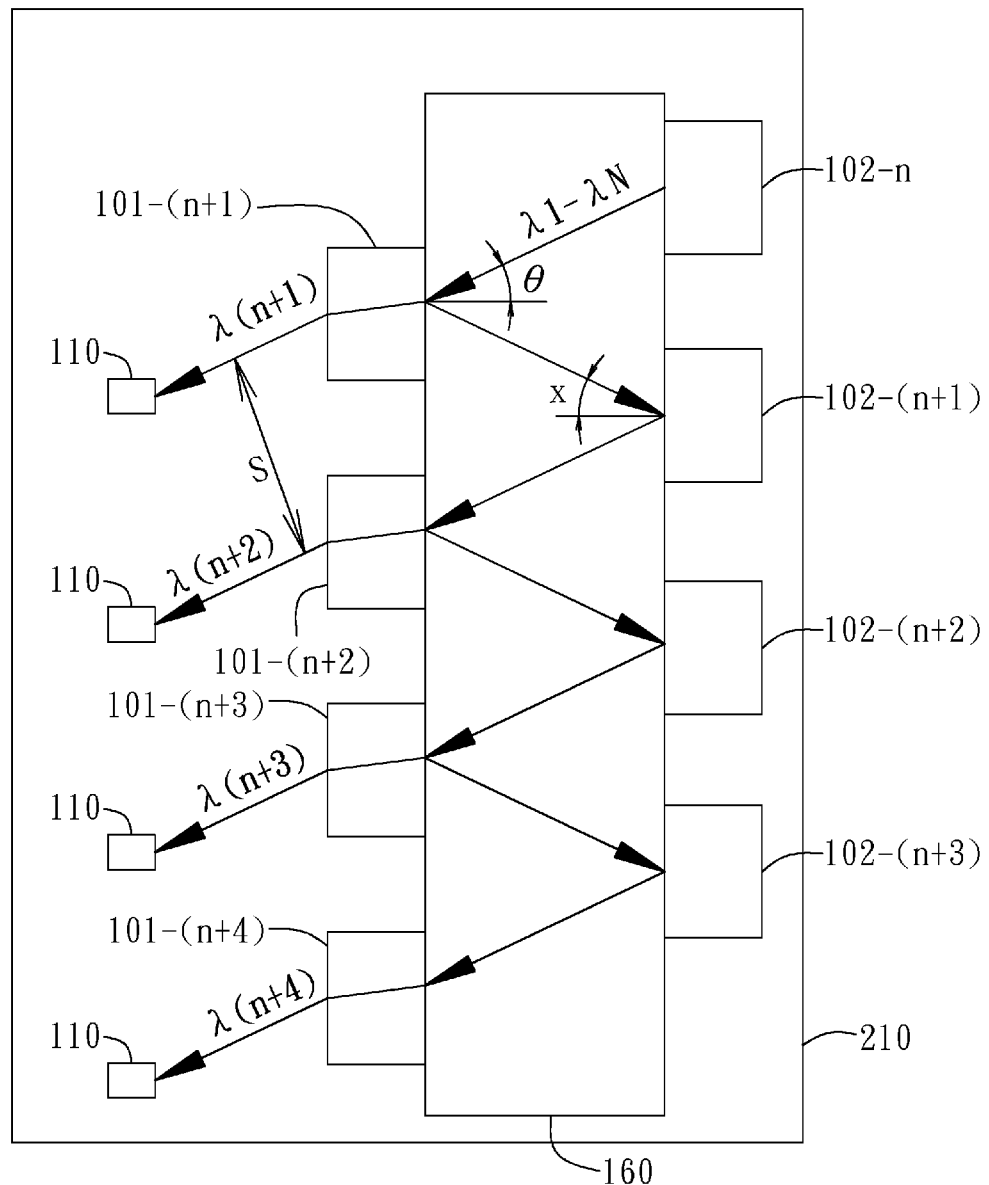
FIG. 12 illustrates a schematically top view of a WDDM module in accordance with a fifth embodiment of the present invention.

Alternatively, FIG. 12 illustrates a schematically top view of a WDDM module in accordance with a fifth embodiment of the present invention. Referring to FIG. 12, the optical splitters 101-1 through 101-N may be set to have their light incident surfaces, configured to receive and reflect the input light beam, to be coplanar along a left side of the spacer 160. The mirrors 102-1 through 102-(N−1) may be set to have their light reflecting surfaces, configured to reflect the input light beam, to be coplanar along a right side of the spacer 160. The light incident surfaces of the optical splitters 101-1 through 101-N may be substantially in parallel to the light reflecting surfaces of the mirrors 102-1 through 102-(N−1). Thereby, the distance of the light beam propagating from the optical splitter 101-$n$ to the mirror 102-$n$ may be substantially equal to that of the light beam propagating from the mirror 102-$n$ to the optical splitter 101-($n$+1) where n may be an integer ranging from, equal to or greater than 1 up to, equal to or less than (N−1). All of the optical splitters 101-1 through 101-N have substantially the same angle θ of incidence of the input light beam, and all of the mirrors 102-1 through 102-(N−1) and 107 may have substantially the same angle x of incidence of the input light beam, wherein the angle x of incidence may be substantially the same as the angle θ of incidence. In this case, if the output light beams emitted from the light exit surfaces of the optical splitters 101-1 through 101-N respectively have the wavelengths λ1-λN that are substantially the same, the output light beams may propagate substantially in parallel to each other or one another and in substantially the same direction to the respective light processors 110 with substantially the same space S between each adjacent two of the output light beams. The light beams propagating from the mirror 102-$n$ to the optical splitter 101-($n$+1) respectively may be substantially in parallel to each other or one another where n may be an integer ranging from, equal to or greater than 1 up to, equal to or less than (N−1). The light beams propagating from the optical splitter 101-$n$ to the mirror 102-$n$ respectively may be substantially in parallel to each other or one another where n may be an integer ranging from, equal to or greater than 1 up to, equal to or less than (N−1). Substantially the same separation or space may be kept between each adjacent two of the light beams propagating from the mirrors 102-1 through 102-(N−1) to the optical splitters 101-2 through 101-N respectively. Substantially the same separation or space may be kept between each adjacent two of the light beams propagating from the optical splitters 101-1 through 101-(N−1) to the mirrors 102-1 through 102-(N−1) to the optical splitters 101-2 through 101-N respectively. The element, as shown in FIG. 13, indicated by the same reference number as that in FIG. 3 may be referred to the illustration for that in FIG. 3.

Figure 13:
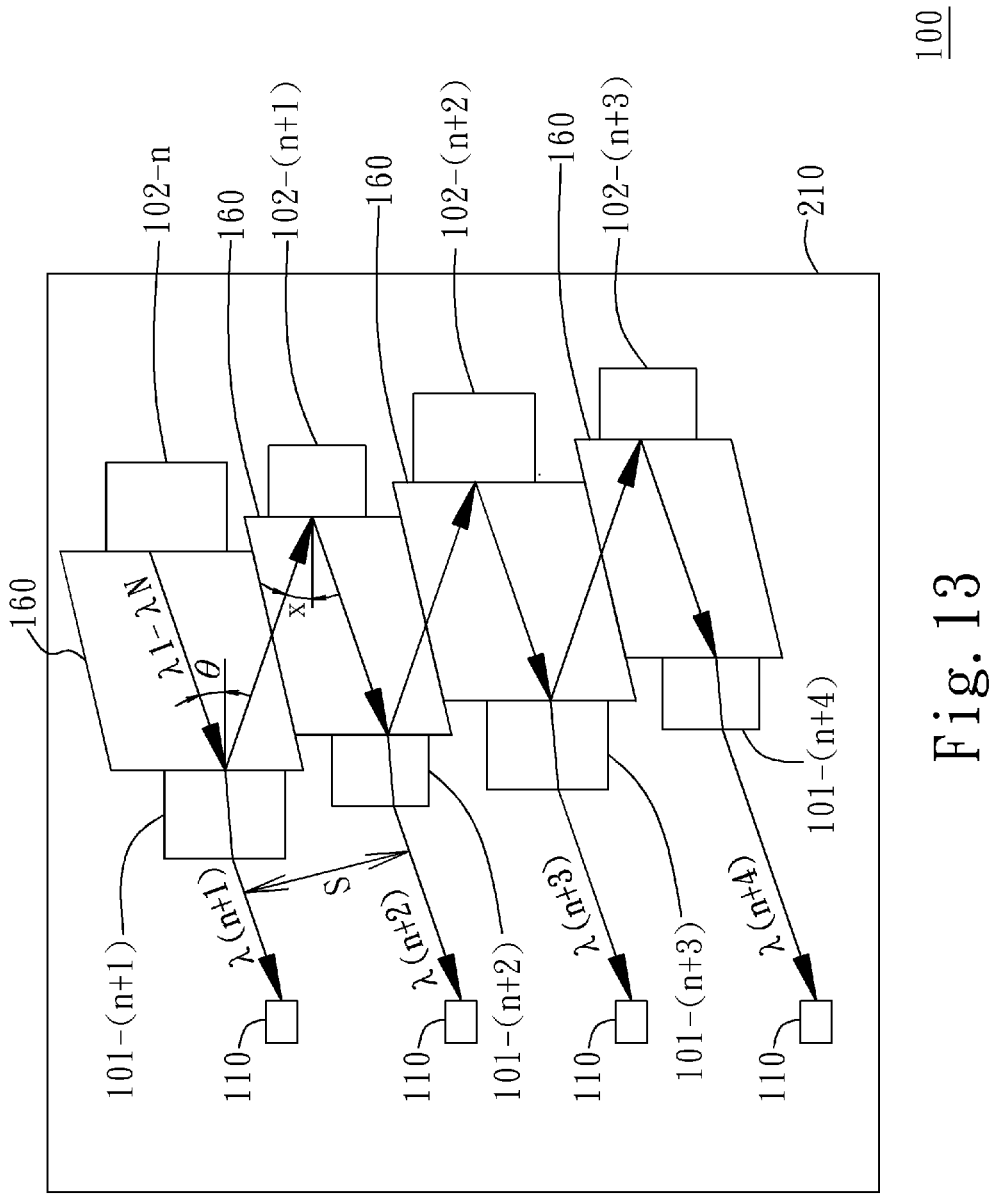
FIG. 13 illustrates a schematically top view of a WDDM module in accordance with a sixth embodiment of the present invention.

Alternatively, FIG. 13 illustrates a schematically top view of a WDDM module in accordance with a sixth embodiment of the present invention. Referring to FIG. 13, the optical splitters 101-1 through 101-N may be set to have their light incident surfaces, configured to receive and reflect the input light beam, to be substantially in parallel to each other or one another. The mirrors 102-1 through 102-(N−1) may be set to have their light reflecting surfaces, configured to reflect the input light beam, to be substantially in parallel to each other or one another. The light incident surfaces of the optical splitters 101-1 through 101-N may be substantially in parallel to the light reflecting surfaces of the mirrors 102-1 through 102-(N−1). Thereby, the distance of the light beam propagating from the optical splitter 101-$n$ to the mirror 102-$n$ may be greater than that of the light beam propagating from the mirror 102-$n$ to the optical splitter 101-($n$+1) where n may be an integer ranging from, equal to or greater than 1 up to, equal to or less than (N−1). All of the optical splitters 101-1 through 101-N have substantially the same angle θ of incidence of the input light beam, and all of the mirrors 102-1 through 102-(N−1) and 107 may have substantially the same angle x of incidence of the input light beam, wherein the angle x of incidence may be substantially the same as the angle θ of incidence. In this case, even if the output light beams emitted from the light exit surfaces of the optical splitters 101-1 through 101-N respectively have the wavelengths λ1-λN that are different from each other or one another, the distance of the light beam propagating from the optical splitter 101-$n$ to the mirror 102-$n$ and the distance of the light beam propagating from the mirror 102-$n$ to the optical splitter 101-($n$+1) may be adjusted to have the output light beams propagate substantially in parallel to each other or one another and in substantially the same direction to the respective light processors 110 with substantially the same space between each adjacent two of the output light beams where n may be an integer ranging from, equal to or greater than 1 up to, equal to or less than (N−1). The light beams propagating from the mirrors 102-1 through 102-(N−1) to the optical splitters 101-2 through 101-N respectively may be substantially in parallel to each other or one another. The light beams propagating from the optical splitters 101-1 through 101-(N−1) to the mirror 102-1 through 102-(N−1) respectively may be substantially in parallel to each other or one another. Separation of a pair of the optical splitter 101-*n* and the mirror 101-(*n*−1), i.e. the distance in which the light beam propagates from the mirror 101-(*n*−1) in the pair to the optical splitter 101-*n* in the pair, may be different from separation of another pair of the optical splitter 101-*n* and the mirror 101-(*n*−1), i.e. the distance in which the light beam propagates from the mirror 101-(*n*−1) in the another pair to the optical splitter 101-*n* in the another pair where n may be an integer ranging from, equal to or greater than 2 up to, equal to or less than N. Separation of a pair of the optical splitter 101-*n* and the mirror 101-*n*, i.e. the distance in which the light beam propagates from the optical splitter 101-*n* in the pair to the mirror 102-*n* in the pair, may be different from separation of another pair of the optical splitter 101-*n* and the mirror 101-*n*, i.e. the distance in which the light beam propagates from the splitter 101-*n* in the another pair to the mirror 102-*n* in the another pair where n may be an integer ranging from, equal to or greater than 1 up to, equal to or less than (N−1). The element, as shown in FIG. 12, indicated by the same reference number as that in FIG. 3 may be referred to the illustration for that in FIG. 3.

Referring to FIG. 13, in order to align the optical splitters 101-1 through 101-N in required positions and angles relative to the mirrors 102-1 through 102-(N−1), a spacer 160 may be may be composed of multiple discrete portions, each of which may be provided on the base substrate 210 and may have a light incident surface, configured to receive and reflect the input light beam, of one of the optical splitter 101-(*n*+1) abut against a left side thereof and have a light reflecting surface, configured to reflect the input light beam, of one of the mirror 102-*n* abut against a right side thereof where n may be an integer ranging from, equal to or greater than 1 up to, equal to or less than (N−1). Each of the discrete portions of the spacer 160 may be made of a glass or ceramic substrate with a thickness t1 between 0.01 mm and 1 mm.

Figure 14:
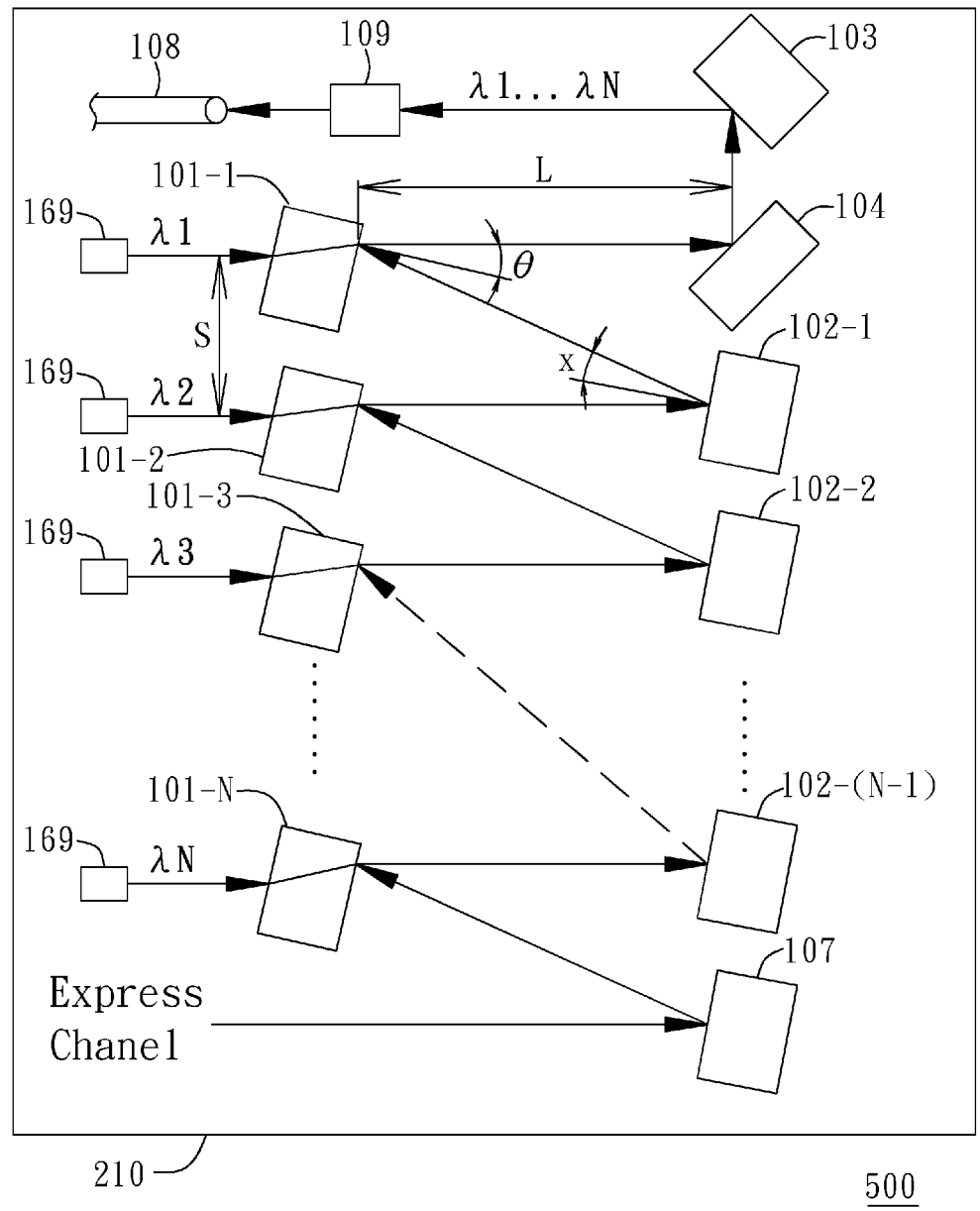
FIG. 14 illustrates light paths of a WDM module provided by the architecture illustrated in FIG. 3 in accordance with a seventh embodiment of the present application.
Figure 15:
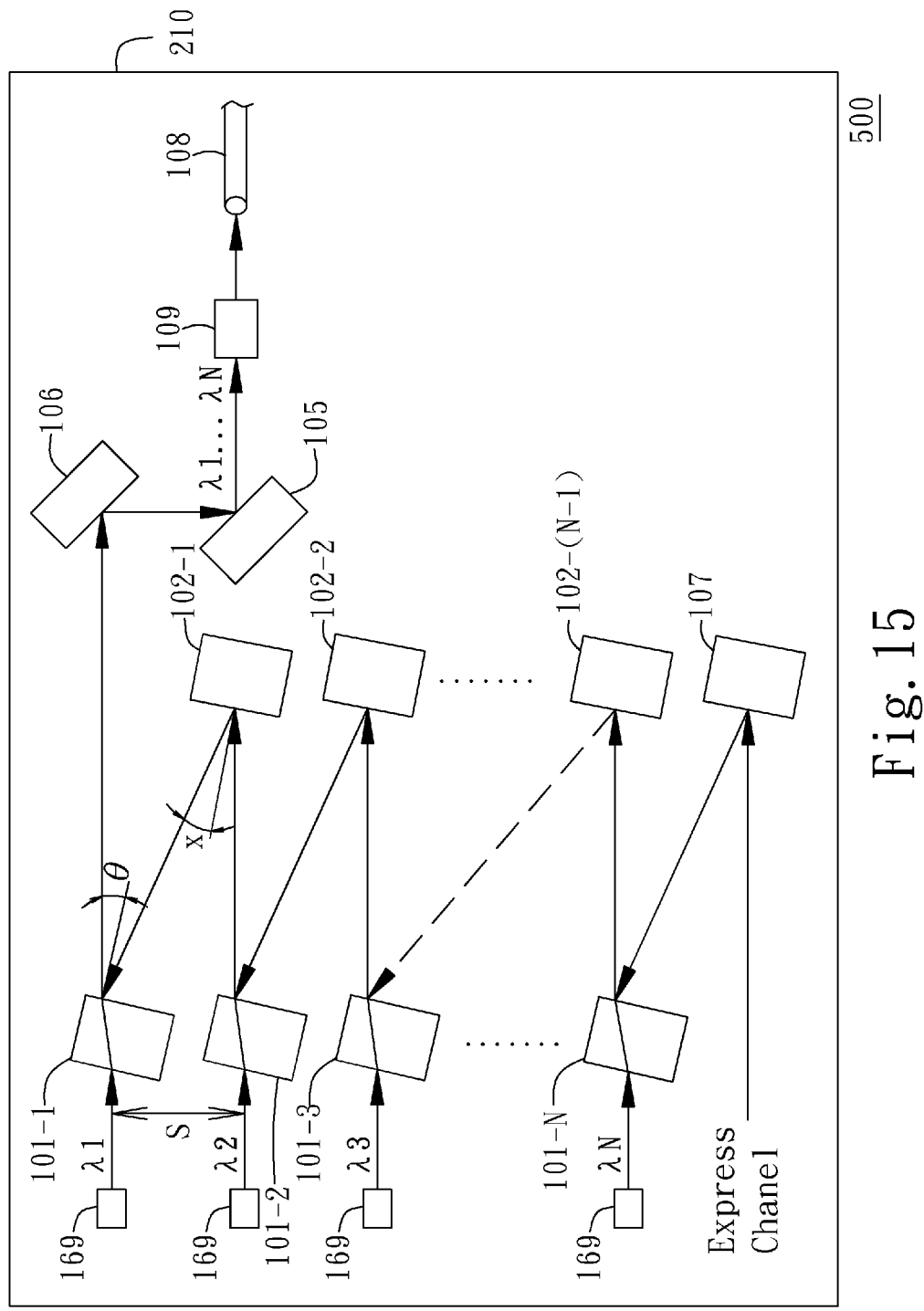
FIG. 15 illustrates light paths of a WDM module provided by the architecture illustrated in FIG. 4 in accordance with an eighth embodiment of the present application.
Figure 16:
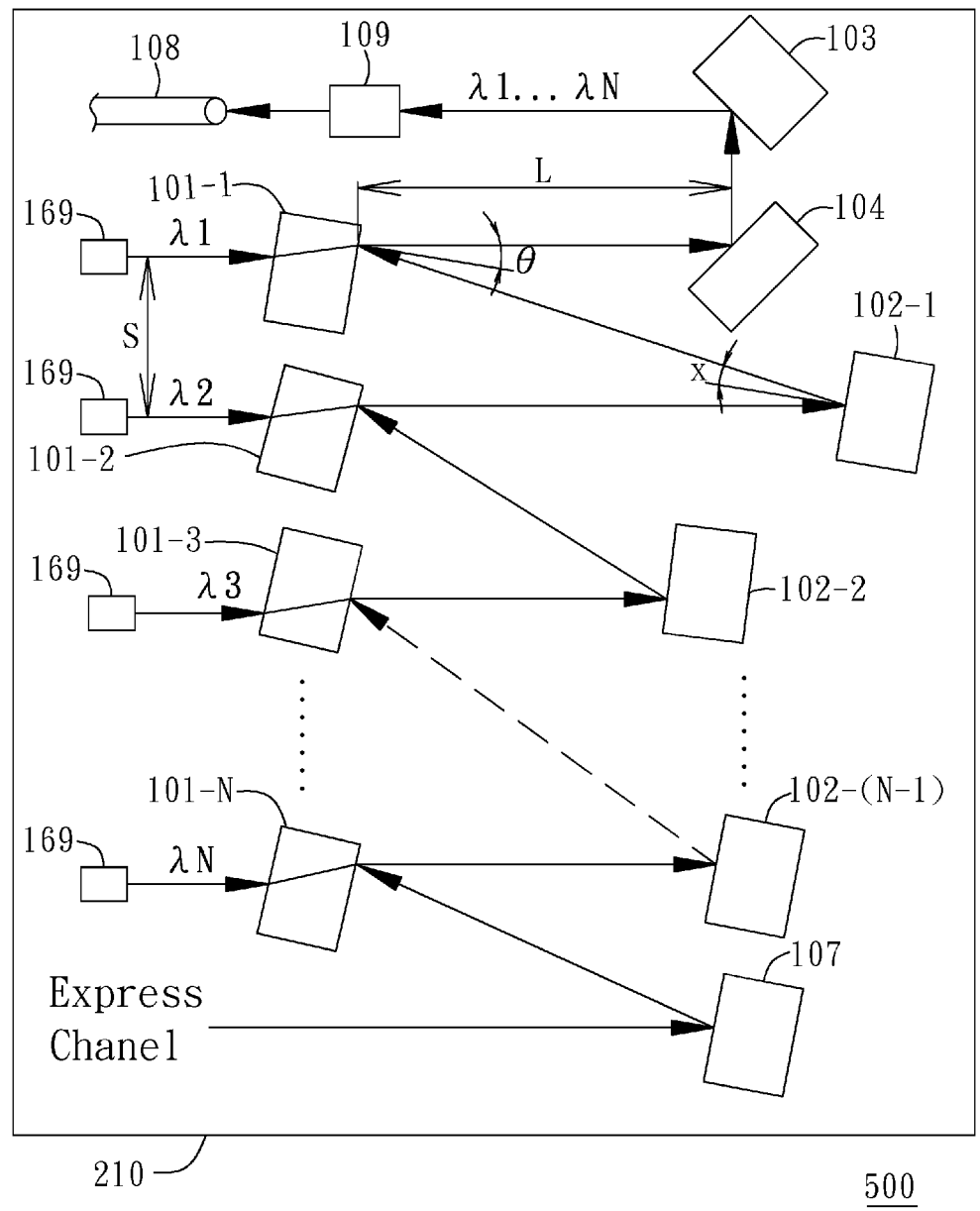
FIG. 16 illustrates light paths of a WDM module provided by the architecture illustrated in FIG. 5 in accordance with a ninth embodiment of the present application.
Figure 17:
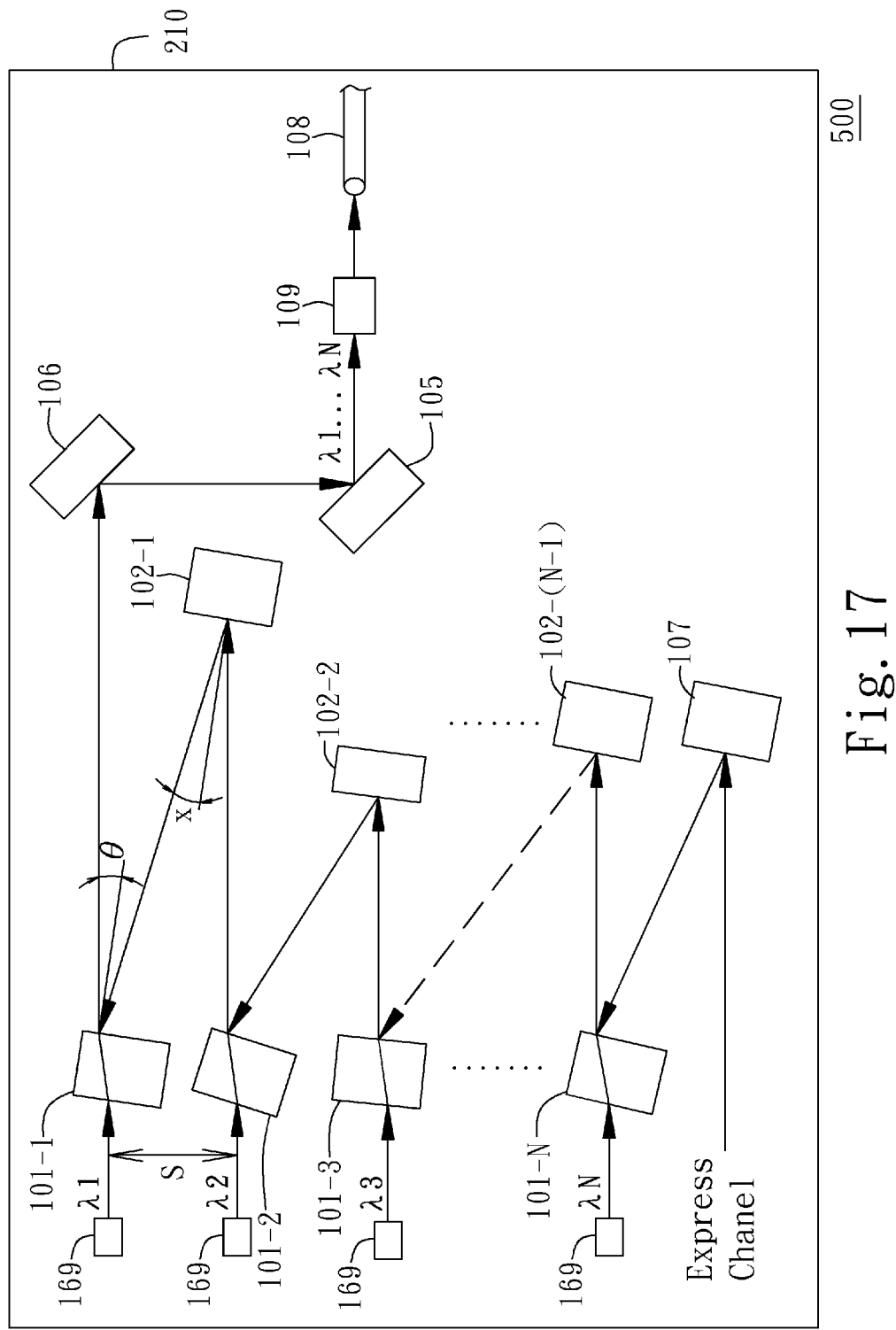
FIG. 17 illustrates light paths of a WDM module provided by the architecture illustrated in FIG. 6 in accordance with an tenth embodiment of the present application.
Figure 18:
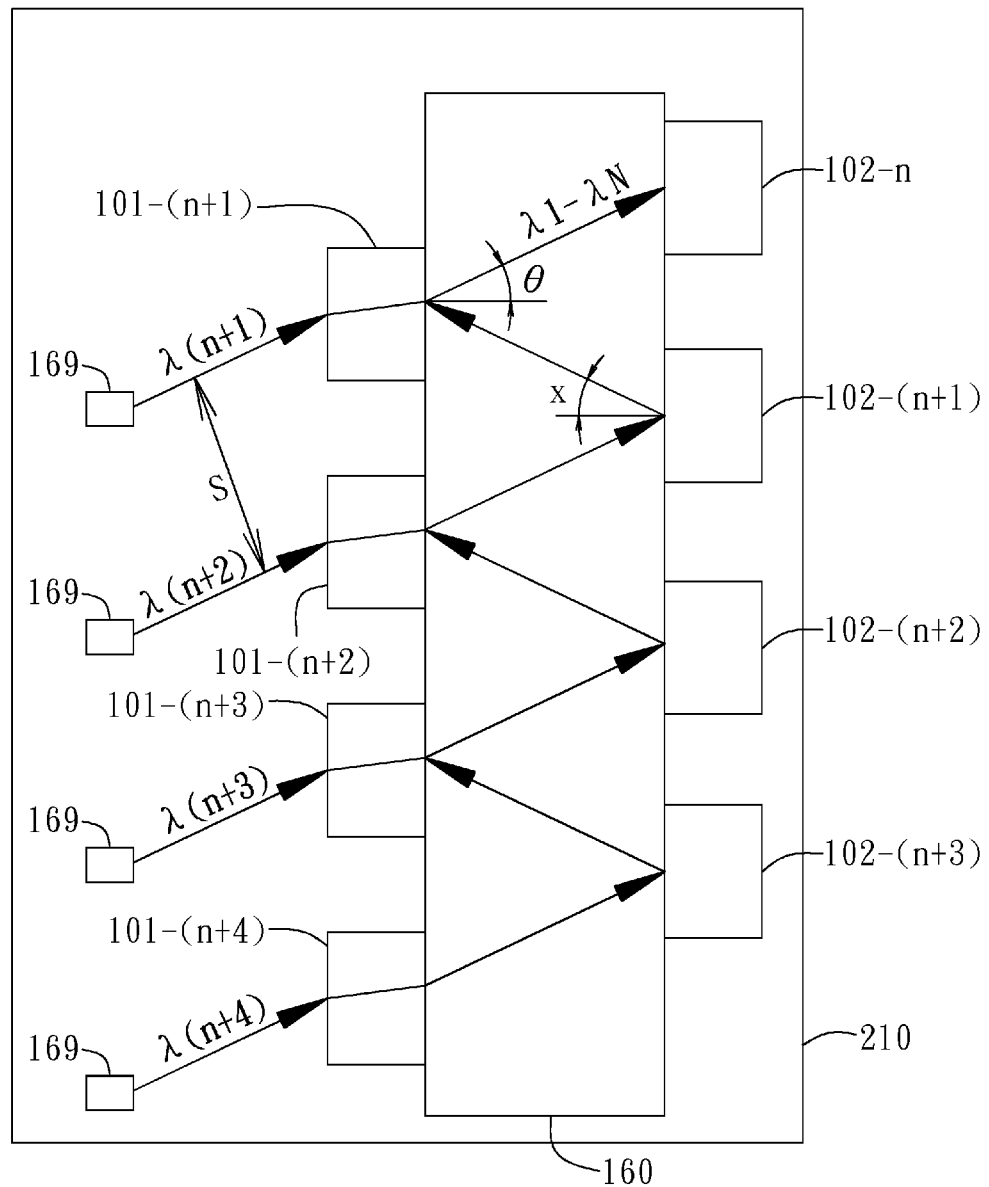
FIG. 18 illustrates light paths of a WDM module provided by the architecture illustrated in FIG. 12 in accordance with an eleventh embodiment of the present application.
Figure 19:
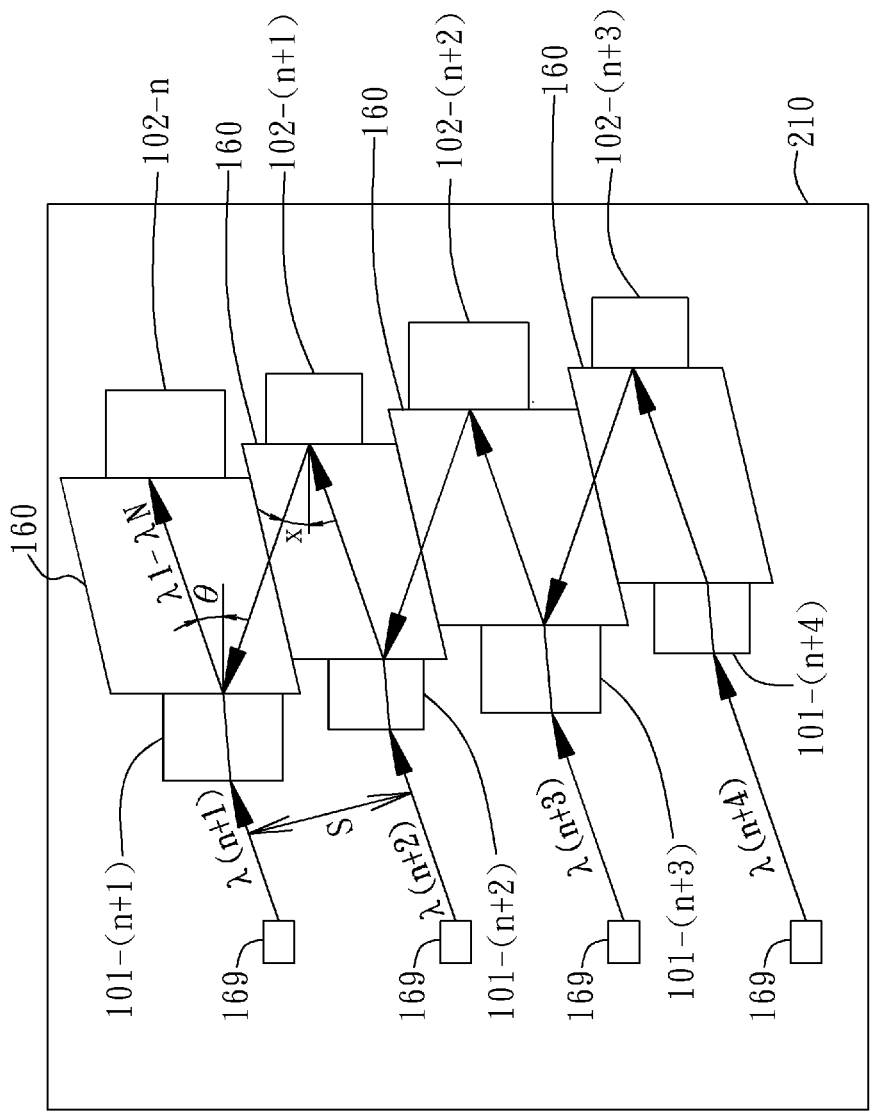
FIG. 19 illustrates light paths of a WDM module provided by the architecture illustrated in FIG. 13 in accordance with a twelfth embodiment of the present application.

Alternatively, the same configuration can be used for a WDM module by reversing the light propagation directions. FIG. 14 illustrates light paths of a WDM module provided by the architecture illustrated in FIG. 3 in accordance with a seventh embodiment of the present application. FIG. 15 illustrates light paths of a WDM module provided by the architecture illustrated in FIG. 4 in accordance with an eighth embodiment of the present application. FIG. 16 illustrates light paths of a WDM module provided by the architecture illustrated in FIG. 5 in accordance with a ninth embodiment of the present application. FIG. 17 illustrates light paths of a WDM module provided by the architecture illustrated in FIG. 6 in accordance with an tenth embodiment of the present application. FIG. 18 illustrates light paths of a WDM module provided by the architecture illustrated in FIG. 12 in accordance with an eleventh embodiment of the present application. FIG. 19 illustrates light paths of a WDM module provided by the architecture illustrated in FIG. 13 in accordance with a twelfth embodiment of the present application. Multiple WDM modules 500 illustrated in the seventh through twelfth embodiments may have the same architectures as those of the respective WDDM modules 100 illustrated in the first through sixth embodiments but perform different functions than the respective WDDM modules 100 illustrated in the first through sixth embodiments perform, as mentioned below. The devices acting as the optical splitters 101-1 through 10-N may be changed as optical combiners. The light paths for transmitting the output light beams, in the first through sixth embodiments, having the respective center wavelength λ1-λN may be changed for transmitting multiple input light beams, i.e. channels of the WDM module, having the respective center wavelength λ1-λN. The light paths for transmitting the input light beam back and forth between the set of optical splitters 101-1 through 101-N and the set of mirrors 102-1 through 102-(N−1) as illustrated in the first through sixth embodiments may be changed for transmitting a multiplexed or combined light beam back and forth between the set of optical combiners 101-1 through 101-N and the set of mirrors 102-1 through 102-(N−1). The device has a surface acting as the light exit surface of the optical splitters 101-*n*, which may be changed as a light incident surface of the optical combiner for receiving an input light beam having the center wavelength λn collimated by an input collimator 169 mounted on the base substrate 210 where n may be an integer ranging from, equal to or greater than 1 up to, equal to or less than N, wherein the input light beam may be transmitted from an optical fiber or a laser emitter to the input collimator 169 to be collimated. The device has another surface acting as the light incident surface of the optical splitters 101-*n*, which may be changed as a light exit surface of the optical combiner. The input light beam may propagate through the optical combiner 101-*n* to be emitted from the light exit surface of the optical combiner 101-*n* and combined with a multiplexed light beam from the optical combiner 101-(*n*+1) into another multiplexed light beam to propagate to the optical combiner 101-(*n*−1) where n may be an integer ranging from, equal to or greater than 2 up to, equal to or less than (N−1). The mirror 102-*n* is configured to reflect a light beam multiplexed or combined by the optical combiner 101-(*n*+1) to the optical combiner 101-*n* where n may be an integer ranging from, equal to or greater than 1 up to, equal to or less than (N−1).

In the seventh and ninth embodiments, referring to FIGS. 14 and 16, an output light beam may be transmitted from the same side of the WDM module 500, e.g., its left side, as the input light beams are incident to the optical combiners 101-1 through 101-N. The WDM module 500 may include two mirrors 103 and 104 coupled to the optical combiner 101-1 and arranged at the right side of the WDM module 500. The output light beam multiplexed or combined by the optical combiners 101-1 may be reflected sequentially by the mirrors 104 and 103 to propagate to a light processor 501. In assembly, the output collimator of the light processor 501, the input collimators 169, the optical combiners 101-1 through 101-N and the mirrors 103, 104 and 102-1 through 102-(N−1) may be fixed on the common base substrate 210 shown in FIGS. 7 and 10. Further, the cover substrate 220 shown in FIG. 10 may be provided to have a bottom surface mounted onto a top side of each of the optical combiners 101-1 through 101-N and mirrors 103, 104, 102-1 through 102-(N−1) and 107.

In the eighth and tenth embodiments, referring to FIGS. 15 and 17, an output light beam may be transmitted from a different side of the WDM module 500, e.g., its right side, than the input light beams are incident to the optical combiners 101-1 through 101-N. The WDM module 500 may include two mirrors 105 and 106 coupled to the optical combiner 101-1 and arranged at the right side of the WDM module 500. The output light beam multiplexed or combined by the optical combiners 101-1 may be reflected sequentially by the mirrors 106 and 105 to propagate to a light processor 501. In assembly, the output collimator of the light processor 501, the input collimators 169, the optical combiners 101-1 through 101-N and the mirrors 103, 104 and 102-1 through 102-(N−1) may be fixed on the common base substrate 210 shown in FIGS. 7 and 10. Further, the cover substrate 220 shown in FIG. 10 may be provided to have a bottom surface mounted onto a top side of each of the optical combiners 101-1 through 101-N and mirrors 105, 106, 102-1 through 102-(N−1) and 107.

The light processors 501 may include an output collimator configured to receive the output light beam, reflected by the mirror 103 illustrated in the seventh and ninth embodiments or the mirror 105 illustrated in the eighth and tenth embodiments, and collimate the output light beam, an optical detector configured to receive an optical signal associated with the collimated output light beam and convert the optical signal into an electronic signal and an amplifier configured to amplify the electronic signal. Alternatively, an optical fiber may be provided to receive the collimated light beam emitted from the output collimator of the respective light processor 110.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Furthermore, unless stated otherwise, the numerical ranges provided are intended to be inclusive of the stated lower and upper values. Moreover, unless stated otherwise, all material selections and numerical values are representative of preferred embodiments and other ranges and/or materials may be used.

The scope of protection is limited solely by the claims, and such scope is intended and should be interpreted to be as broad as is consistent with the ordinary meaning of the language that is used in the claims when interpreted in light of this specification and the prosecution history that follows, and to encompass all structural and functional equivalents thereof.

What is claimed is:

1. A wavelength division de-multiplexer comprising:
   a base substrate;
   an input collimator having a bottom side on said base substrate, wherein an input light beam is configured to be collimated by said input collimator to be emitted from said input collimator;
   a first mirror having a bottom side on said base substrate;
   a second mirror having a bottom side on said base substrate;
   a third mirror having a bottom side on said base substrate;
   a first optical splitter having a bottom side on said base substrate, wherein said first mirror is configured to reflect a first light beam, deriving from said input light beam, to said first optical splitter, wherein said first optical splitter is configured to split said first light beam into a second light beam passing through said first optical splitter to exit from a first light exit surface of said first optical splitter and a third light beam reflecting to said second mirror; and
   a second optical splitter having a bottom side on said base substrate, wherein said second mirror is configured to reflect said third light beam to said second optical splitter, wherein said second optical splitter is configured to split said third light beam into a fourth light beam passing through said second optical splitter to exit from a second light exit surface of said second optical splitter and a fifth light beam reflecting to said third mirror, wherein said first light beam reflected from said first mirror to said first optical splitter is exactly parallel to said third light beam reflected from said second mirror to said second optical splitter, wherein said second light beam exiting from said first light exit surface is exactly parallel to said fourth light beam exiting from said second light exit surface and exactly parallel to said input light beam emitted from said input collimator and propagates in exactly the same direction as said fourth light beam propagates.

2. The wavelength division de-multiplexer of claim 1, wherein said input light beam emitted from said input collimator in an opposite direction to said second light beam exiting from said first light exit surface and to said fourth light beam exiting from said second light exit surface.

3. The wavelength division de-multiplexer of claim 1 further comprising an output collimator on said base substrate, wherein said output collimator is configured to collimate said second light beam.

4. The wavelength division de-multiplexer of claim 1 further comprising an optical detector configured to receive an optical signal associated with said second light beam and convert said optical signal into an electronic signal.

5. The wavelength division de-multiplexer of claim 4 further comprising an amplifier configured to amplify said electronic signal.

6. The wavelength division de-multiplexer of claim 1, wherein said first optical splitter has a first angle of incidence of said first light beam and said second optical splitter has a second angle of incidence of said third light beam, wherein said first angle is different from said second angle.

7. The wavelength division de-multiplexer of claim 6, wherein a difference between said first and second angles range from 0.1 degree to 10 degrees.

8. The wavelength division de-multiplexer of claim 1, wherein said input light beam derives from an optical fiber.

9. The wavelength division de-multiplexer of claim 1 further comprising a cover substrate joining a top side of said first mirror, a top side of said second mirror, a top side of said third mirror, a top side of said first optical splitter and a top side of said second optical splitter.

10. The wavelength division de-multiplexer of claim 9, wherein said cover substrate comprises glass.

11. The wavelength division de-multiplexer of claim 9, wherein said cover substrate comprises ceramic.

12. The wavelength division de-multiplexer of claim 1, wherein said input light beam emitted from said input collimator in exactly the same direction as said second light beam exiting from said first light exit surface and as said fourth light beam exiting from said second light exit surface.

13. The wavelength division de-multiplexer of claim 1, wherein said base substrate comprises glass.

14. The wavelength division de-multiplexer of claim 1, wherein said base substrate comprises ceramic.

15. The wavelength division de-multiplexer of claim 1, wherein said second light beam has a different wavelength from said fourth light beam.

16. The wavelength division de-multiplexer of claim 1, wherein said first light beam reflected from said first mirror to said first optical splitter propagates in exactly the same direction as said second light beam exiting from said first light exit surface propagates.

17. The wavelength division de-multiplexer of claim 1, wherein said first light beam reflected from said first mirror to said first optical splitter propagates in a different distance than said third light beam reflected from said second mirror to said second optical splitter propagates.

18. The wavelength division de-multiplexer of claim 1 further comprising a third optical splitter having a bottom side on said base substrate, wherein said third mirror is configured to reflect said fifth light beam to said third optical splitter, wherein said third optical splitter is configured to split said fifth light beam into a sixth light beam passing through said third optical splitter to exit from a third light exit surface of said third optical splitter and a seventh light beam reflecting from a light incident surface from said third splitter, wherein a vertical space between said second and fourth light beams is exactly the same as that between said fourth and sixth light beams.

19. A wavelength division de-multiplexer comprising:
- a base substrate;
- an input mirror having a bottom side on said base substrate, wherein a first light beam is configured to be incident to said input mirror;
- a first mirror having a bottom side on said base substrate, wherein said input mirror is configured to reflect said first light beam to said first mirror;
- a second mirror having a bottom side on said base substrate;
- a third mirror having a bottom side on said base substrate;
- a first optical splitter having a bottom side on said base substrate, wherein said first mirror is configured to reflect a first light beam to said first optical splitter, wherein said first optical splitter is configured to split said first light beam into a second light beam passing through said first optical splitter to exit from a first light exit surface of said first optical splitter and a third light beam reflecting to said second mirror, wherein said first light beam reflected from said first mirror to said first optical splitter propagates in exactly the same direction as said second light beam exiting from said first light exit surface propagates; and
- a second optical splitter having a bottom side on said base substrate, wherein said second mirror is configured to reflect said third light beam to said second optical splitter, wherein said second optical splitter is configured to split said third light beam into a fourth light beam passing through said second optical splitter to exit from a second light exit surface of said second optical splitter and a fifth light beam reflecting to said third mirror, wherein said first light beam reflected from said first mirror to said first optical splitter is exactly parallel to said third light beam reflected from said second mirror to said second optical splitter, wherein said second light beam exiting from said first light exit surface is exactly parallel to said fourth light beam exiting from said second light exit surface and propagates in exactly the same direction as said fourth light beam propagates, wherein said first light beam reflected from said first mirror to said first optical splitter propagates in exactly in parallel to said first light beam incident to said input mirror.

20. The wavelength division de-multiplexer of claim 19, wherein said first light beam reflected from said first mirror to said first optical splitter propagates in an opposite direction to said first light beam incident to said input mirror.

\* \* \* \* \*